(12) United States Patent
Yamamoto et al.

(10) Patent No.: US 8,576,165 B2
(45) Date of Patent: Nov. 5, 2013

(54) INPUT DEVICE AND METHOD, INFORMATION PROCESSING APPARATUS AND METHOD, INFORMATION PROCESSING SYSTEM, AND PROGRAM

(75) Inventors: Kazuyuki Yamamoto, Kanagawa (JP); Ken Onogi, Tokyo (JP)

(73) Assignee: Sony Corporation, Tokyo (JP)

( * ) Notice: Subject to any disclaimer, the term of this patent is extended or adjusted under 35 U.S.C. 154(b) by 839 days.

(21) Appl. No.: 12/637,005

(22) Filed: Dec. 14, 2009

(65) Prior Publication Data

US 2010/0188334 A1 Jul. 29, 2010

(30) Foreign Application Priority Data

Jan. 23, 2009 (JP) ................ 2009-012984

(51) Int. Cl.
*G09G 5/00* (2006.01)

(52) U.S. Cl.
USPC ........... 345/156; 345/157; 345/158; 345/175; 345/183

(58) Field of Classification Search
USPC .......................... 345/156, 157, 158, 183, 589
See application file for complete search history.

(56) References Cited

U.S. PATENT DOCUMENTS

| | | | | |
|---|---|---|---|---|
| 7,672,806 B2* | 3/2010 | Tronconi et al. | ............ | 702/141 |
| 7,796,116 B2* | 9/2010 | Salsman et al. | ............ | 345/158 |
| 2004/0227741 A1* | 11/2004 | Koda et al. | ............ | 345/183 |
| 2006/0250358 A1* | 11/2006 | Wroblewski | ............ | 345/157 |
| 2007/0075968 A1* | 4/2007 | Hall et al. | ............ | 345/157 |
| 2007/0176896 A1* | 8/2007 | Gritton et al. | ............ | 345/157 |
| 2008/0129682 A1* | 6/2008 | Algreatly | ............ | 345/156 |
| 2008/0129687 A1* | 6/2008 | McAuliffe | ............ | 345/156 |
| 2008/0158155 A1* | 7/2008 | Liberty et al. | ............ | 345/158 |
| 2009/0213134 A1* | 8/2009 | Stephanick et al. | ............ | 345/589 |
| 2013/0016120 A1* | 1/2013 | Redkov et al. | ............ | 345/589 |

FOREIGN PATENT DOCUMENTS

| | | |
|---|---|---|
| EP | 0 429 391 A1 | 5/1991 |
| JP | 6-7371 | 1/1994 |
| JP | 2000-270236 | 9/2000 |

OTHER PUBLICATIONS

U.S. Appl. No. 12/628,526, filed Dec. 1, 2009, Yamamoto.
U.S. Appl. No. 12/631,948, filed Dec. 7, 2009, Nikura, et al.
U.S. Appl. No. 12/687,401, filed Jan. 14, 2010, Yamamoto, et al.
U.S. Appl. No. 12/636,938, filed Dec. 14, 2009, Yamamoto, et al.

* cited by examiner

*Primary Examiner* — Thuy Pardo
(74) *Attorney, Agent, or Firm* — Sony Corporation

(57) ABSTRACT

An input device includes: an operating section which is held by a user and operated in a three-dimensional free space in order to operate an information processing apparatus by remote control; a calculation section which calculates a hand shake related value for controlling selection of an image to be controlled which is displayed on the information processing apparatus, the hand shake related value being relevant to an amount of hand shake of the operating section; and an output section which outputs the hand shake related value as an operation signal for operating the information processing apparatus by remote control.

20 Claims, 30 Drawing Sheets

FIG. 17

| TITLE | TYPE | GENRE · SUBGENRE | OTHER RELATED INFORMATION GROUP | HAND SHAKE RELATED VALUE (DEGREE OF RELAX) |
|---|---|---|---|---|
| XXXXX | VIDEO | MOVIE: VIOLENCE | ... | 1 |
| XXXXX | VIDEO | DOCUMENT: HISTORY | ... | 4 |
| XXXXX | VIDEO | SPORTS: SOCCER | ... | 2 |
| XXX | MUSIC | ROCK | ... | 1 |
| XXX | MUSIC | POPS | ... | 3 |
| XXXXX | ... | ... | ... | ... |

| HAND SHAKE RELATED VALUE "1" | HAND SHAKE RELATED VALUE "2" | HAND SHAKE RELATED VALUE "3" |
|---|---|---|
| 1 | 2 | 3 |
| 1 | 1 | 2 |
| 2 | 1 | 4 |
| 3 | 3 | 4 |
| 4 | 4 | 1 |
| 4 | 4 | 1 |
| 5 | 5 | 5 |
| 5 | 5 | 5 |

FIG. 21A

| TITLE | TYPE | GENRE · SUBGENRE | OTHER RELATED INFORMATION GROUP |
|---|---|---|---|
| XXXXX | VIDEO | MOVIE: VIOLENCE | ... |
| XXXXX | VIDEO | DOCUMENT: HISTORY | ... |
| XXXXX | VIDEO | SPORTS: SOCCER | ... |
| XXX | MUSIC | ROCK | ... |
| XXX | MUSIC | POPS | ... |
| XXXXX | ... | ... | ... |

FIG. 21B

| TYPE | GENRE · SUBGENRE | HAND SHAKE RELATED VALUE (DEGREE OF RELAX) |
|---|---|---|
| VIDEO | MOVIE: VIOLENCE | 1 |
| VIDEO | MOVIE: LOVE | 4 |
| VIDEO | MOVIE: SF | 2 |
| MUSIC | ROCK | 1 |
| MUSIC | POPS | 3 |
| ... | ... | ... |

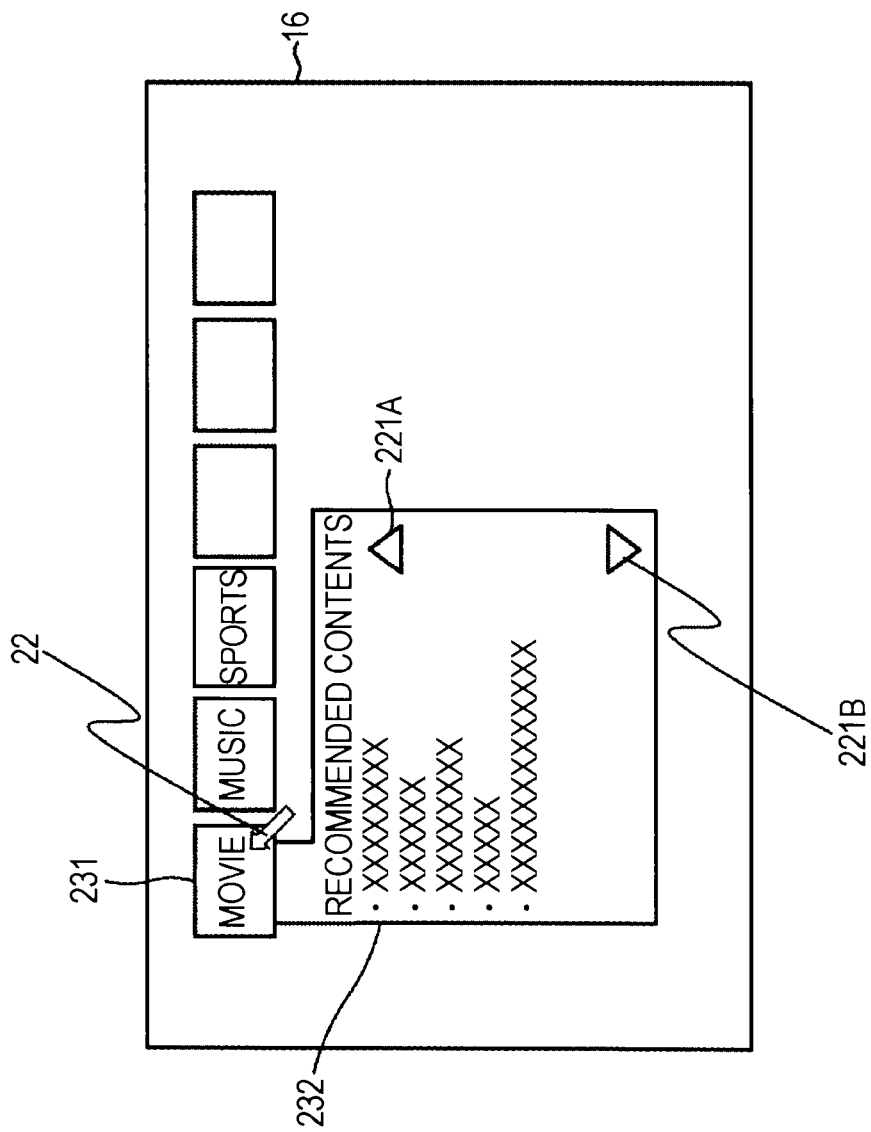

|  | THRESHOLD VALUE DETERMINATION | CALCULATION OF AMOUNT OF HAND SHAKE |
|---|---|---|
| FIG. 9 | ANGULAR VELOCITY (S13) | ANGULAR VELOCITY (S14) |
| FIG. 27 | ANGULAR VELOCITY (S205) | ACCELERATION (S206) |
| FIG. 28 | RATE OF CHANGE OF ANGULAR VELOCITY (S243) & ANGULAR VELOCITY (S245) | ANGULAR VELOCITY (S244) |
| FIG. 29 | RATE OF CHANGE OF ANGULAR VELOCITY (S275) | ACCELERATION (S276) |
| OTHERS | ACCELERATION | ACCELERATION |

INPUT DEVICE AND METHOD, INFORMATION PROCESSING APPARATUS AND METHOD, INFORMATION PROCESSING SYSTEM, AND PROGRAM

BACKGROUND OF THE INVENTION

1. Field of the Invention

The present invention relates to an input device and method, an information processing apparatus and method, an information processing system, and a program. In particular, the present invention relates to an input device and method, an information processing apparatus and method, an information processing system, and a program which make it possible to quickly and correctly select an image to be controlled.

2. Description of the Related Art

In recent years, terrestrial digital television broadcasting has started, and an EPG (Electronic Program Guide) can be displayed on a television receiver. In the EPG, programs are arrayed and displayed in a matrix. A user operates a remote controller to move a pointer to an arbitrary position and selects a predetermined program.

Generally, a remote controller attached to a television receiver can move a pointer only in the vertical or horizontal direction. That is, it is difficult to directly move the pointer from the predetermined display position to the target position in the inclined direction.

For this reason, a remote controller which detects a user's operation toward the arbitrary direction in a three-dimensional free space and moves a pointer in the operated direction has been proposed (for example, see Japanese Patent Publication No. 6-7371).

SUMMARY OF THE INVENTION

In the case of the remote controller of a type in which a user operates the remote controller in the three-dimensional free space as described above, movement of the remote controller in the three-dimensional free space is detected. As a result, the pointer moves not only in the operation direction that the user intends but also in a direction of hand shake when the user holds the remote controller. Accordingly, it becomes difficult to quickly and correctly select a desired icon with a pointer.

In view of the above situation, it is desirable to make possible to quickly and correctly select an image to be controlled.

According to an embodiment of the present invention, there is provided an input device including: an operating section which is held by a user and operated in a three-dimensional free space in order to operate an information processing apparatus by remote control; a calculation section which calculates a hand shake related value for controlling selection of an image to be controlled which is displayed on the information processing apparatus, the hand shake related value being relevant to an amount of hand shake of the operating section; and an output section which outputs the hand shake related value as an operation signal for operating the information processing apparatus by remote control.

Furthermore, according to another embodiment of the present invention, there is provided an information processing apparatus including: a receiving section which receives, as an operation signal from an input device which is held by a user and operated in a three-dimensional free space, a hand shake related value relevant to an amount of hand shake of the input device; a selection section which selects an image to be controlled on the basis of the hand shake related value received from the input device; and a display section which displays the image to be controlled which has been selected by the selection section.

Furthermore, according to still another embodiment of the present invention, there is provided an information processing system including: an input device; and an information processing apparatus which is remote-controlled by the input device. The input device is held by a user and operated in a three-dimensional free space in order to operate the information processing apparatus by remote control, calculates a hand shake related value which is relevant to an amount of hand shake of the input device and is a value for controlling selection of an image to be controlled which is displayed on the information processing apparatus, and outputs the hand shake related value as an operation signal for operating the information processing apparatus by remote control. The information processing apparatus receives the hand shake related value, selects the image to be controlled on the basis of the hand shake related value received from the input device, and displays the selected image to be controlled.

In the input device according to the embodiment of the present invention, the operating section is held by a user and operated in the three-dimensional free space in order to operate the information processing apparatus by remote control. The calculation section calculates the hand shake related value for controlling selection of the image to be controlled which is displayed on the information processing apparatus, the hand shake related value being relevant to the amount of hand shake of the operating section. The output section outputs the hand shake related value as an operation signal for operating the information processing apparatus by remote control.

In the information processing apparatus according to another embodiment of the present invention, the receiving section receives, as an operation signal from the input device which is held by a user and operated in the three-dimensional free space, the hand shake related value relevant to the amount of hand shake of the input device. The selection section selects the image to be controlled on the basis of the hand shake related value received from the input device. The display section displays the image to be controlled which has been selected by the selection section.

In the information processing system according to still another embodiment of the present invention, the input device is held by a user and operated in the three-dimensional free space in order to operate the information processing apparatus by remote control, calculates the hand shake related value which is relevant to the amount of hand shake of the input device and is a value for controlling selection of the image to be controlled which is displayed on the information processing apparatus, and outputs the hand shake related value as an operation signal for operating the information processing apparatus by remote control. The information processing apparatus receives the hand shake related value, selects the image to be controlled on the basis of the hand shake related value received from the input device, and displays the selected image to be controlled.

As described above, according to the embodiment of the present invention, an image to be controlled can be selected quickly and correctly.

BRIEF DESCRIPTION OF THE DRAWINGS

FIG. 17 is a diagram illustrating a database of contents;

FIGS. 21A and 21B are diagrams illustrating database and table of contents;

FIG. 22 is a diagram illustrating the display control processing of an image to be controlled;

DESCRIPTION OF THE PREFERRED EMBODIMENTS

Hereinafter, best modes (hereinafter, referred to as embodiments) for carrying out the present invention will be described. In addition, the explanation will be made in the following order.

1. First embodiment (configuration of a system)
2. First embodiment (configuration of an input device)
3. First embodiment (electrical configuration of an input device)
4. First embodiment (functional configuration of an MPU)
5. First embodiment (first hand shake related value output processing of an input device)
6. First embodiment (display control processing of a television receiver)
7. First embodiment (first display control processing for an image to be controlled of a television receiver)
8. First embodiment (first example of an image to be controlled)
9. First embodiment (second example of an image to be controlled)
10. First embodiment (third example of an image to be controlled)
11. First embodiment (fourth example of an image to be controlled)
12. First embodiment (second display control processing for an image to be controlled of a television receiver)
13. First embodiment (fifth example of an image to be controlled)
14. First embodiment (third display control processing for an image to be controlled of a television receiver)
15. First embodiment (six example of an image to be controlled)
16. First embodiment (hand shake measurement processing of a television receiver)
17. First embodiment (hand shake calculation processing)
18. First embodiment (second hand shake related value output processing of an input device)
19. First embodiment (third hand shake related value output processing of an input device)
20. First embodiment (fourth hand shake related value output processing of an input device)
21. First embodiment (operation when a button is operated)
22. First embodiment (pointer display processing)
23. Second embodiment (configuration of an input device)
24. Third embodiment (configuration of an input device)
25. Modifications <1. First Embodiment>
[Configuration of a System]

Figure 1:
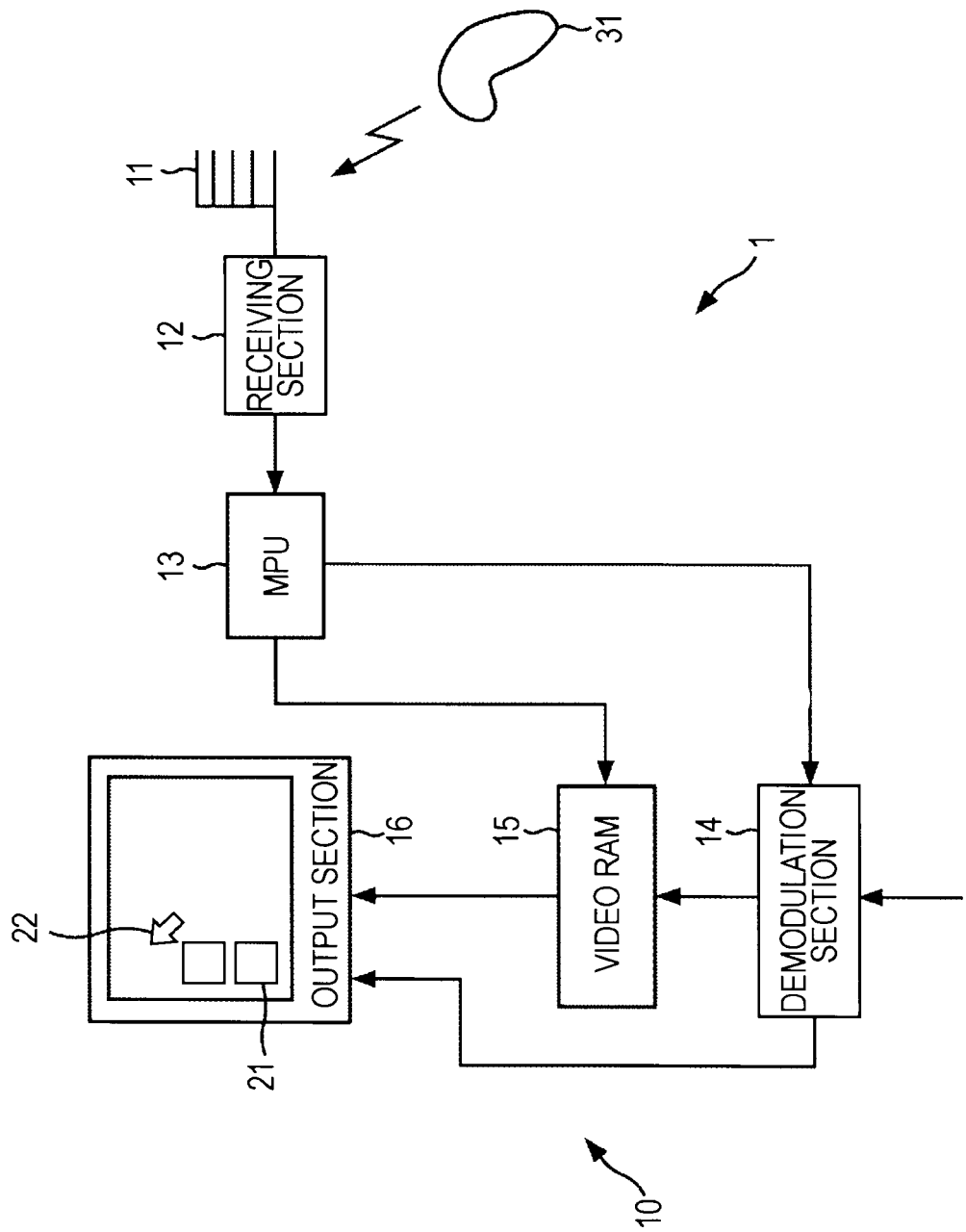
FIG. 1 is a block diagram illustrating the configuration of an information processing system according to an embodiment of the present invention.

FIG. 1 shows the configuration of an information processing system according to an embodiment of the present invention.

An information processing system 1 includes a television receiver 10 as an information processing apparatus and an input device 31 as a pointing device or remote controller which performs remote control of the television receiver 10.

The television receiver 10 includes an antenna 11, a receiving section 12, an MPU (Micro Processing Unit) 13, a demodulation section 14, a video RAM (Random Access Memory) 15, and an output section 16.

The antenna 11 receives a radio wave from the input device 31. The receiving section 12 demodulates the radio wave received through the antenna 11 and outputs it to the MPU 13. The MPU 13 controls each section on the basis of an instruction from the input device 31.

The demodulation section 14 demodulates a television broadcasting signal received through an antenna (not shown) and outputs a video signal to the video RAM 15 and an audio signal to the output section 16. The video RAM 15 mixes an image based on the video signal supplied from the demodulation section 15 with an image of the on-screen data, such as a pointer and an icon, from the MPU 13 and outputs the mixed image to an image display section of the output section 16. The output section 16 displays an image in the image display section and also outputs a sound from a sound output section, such as a speaker.

In the display example shown in FIG. 1, an icon 21 and a pointer 22 are displayed on the image display section of the output section 16. The input device 31 is operated by the user not only when changing the display position of the pointer 22 but also when performing remote control of the television receiver 10.

[Configuration of an Input Device]

Figure 2:
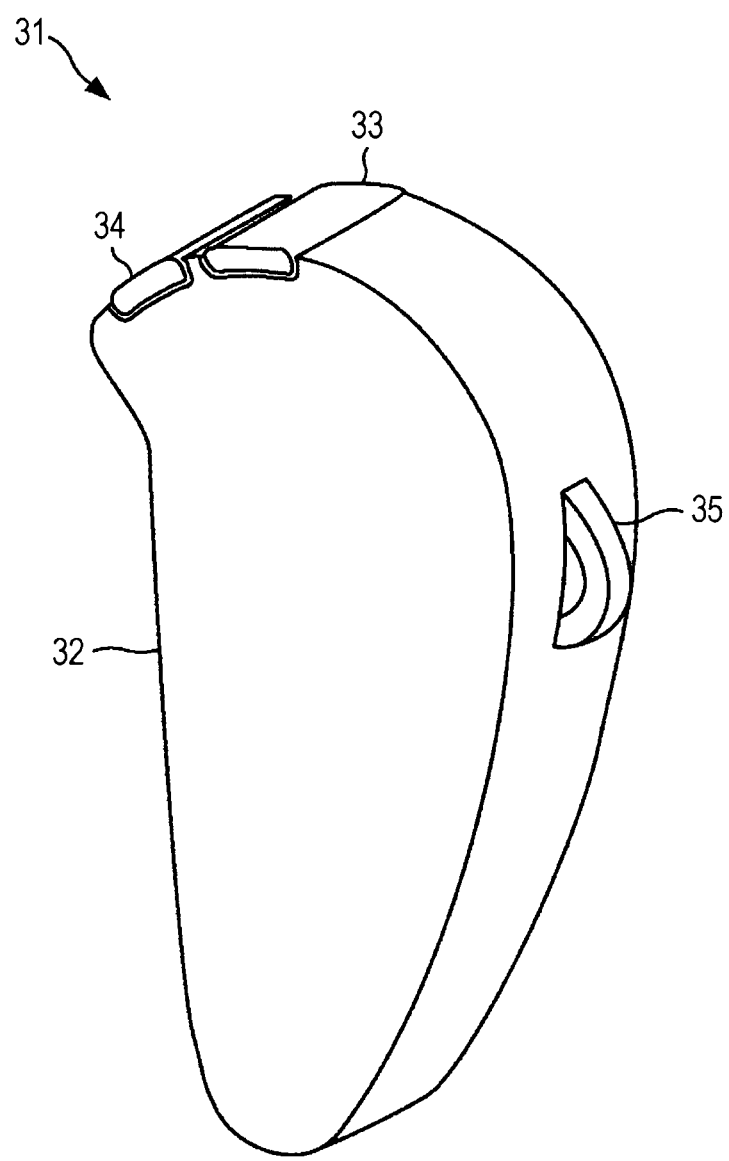
FIG. 2 is a perspective view illustrating the configuration of the outer appearance of an input device.

FIG. 2 shows the configuration of the outer appearance of the input device 31. The input device 31 has a main body 32 as an operating section which is operated by a user in order to generate an operation signal for controlling the information processing apparatus. Buttons 33 and 34 are provided on the upper surface of the main body 32, and a jog dial 35 is provided on the right side surface of the main body 32.

Figure 3:
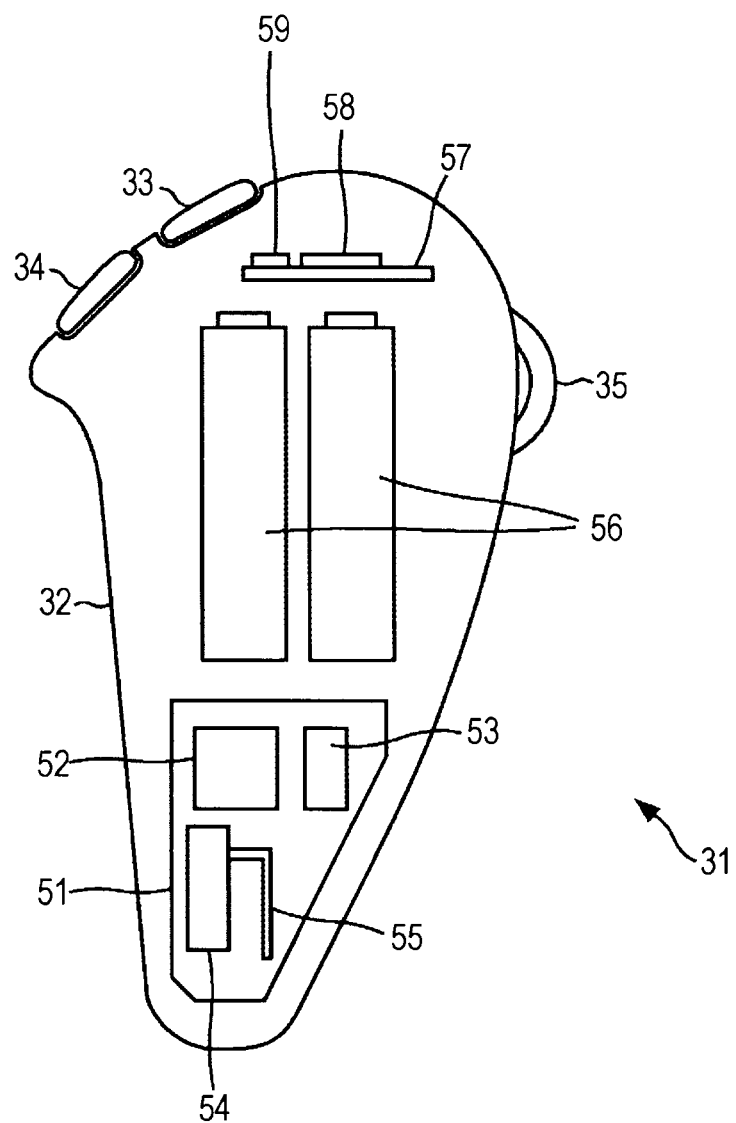
FIG. 3 is a diagram illustrating the inside configuration of the input device.

FIG. 3 shows the inside configuration of the main body 32 of the input device 31. A main substrate 51, a sensor substrate 57, and a battery 56 are provided in the input device 31. An MPU 52, a crystal oscillator 53, a transmission section 54, and an antenna 55 are attached to the main substrate 51.

Figure 4:
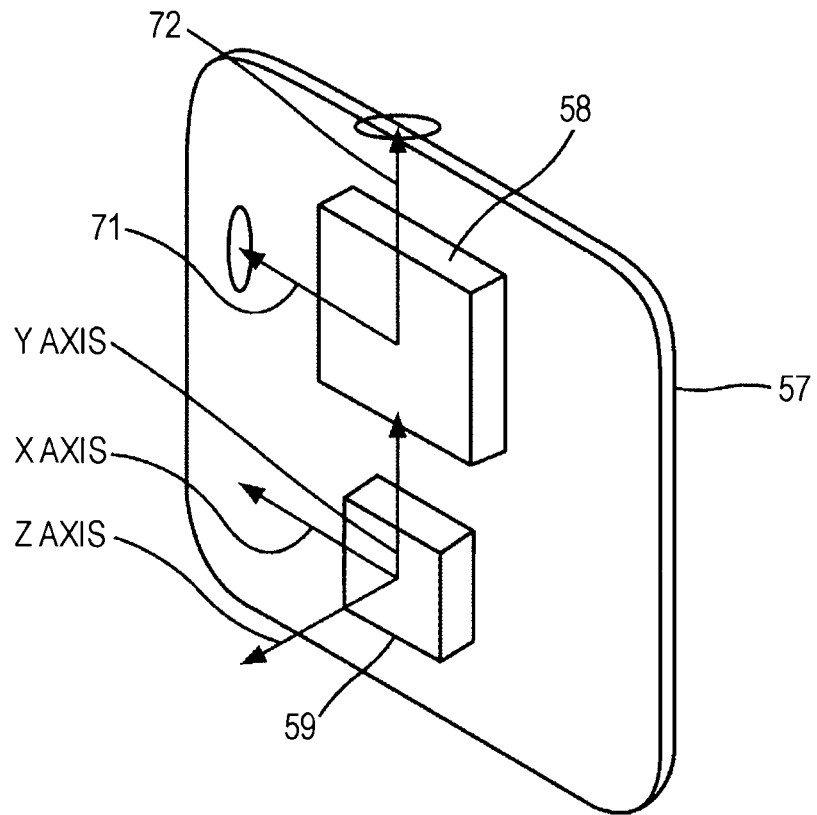
FIG. 4 is a perspective view illustrating the configuration of a sensor substrate.

As shown in FIG. 4 in an enlarged manner, an angular velocity sensor 58 and an acceleration sensor 59 which are manufactured by the technique of MEMS (Micro Electro Mechanical Systems) are attached to the sensor substrate 57. The sensor substrate 57 is parallel to the X and Y axes that are two sensitivity axes, which are perpendicular to each other, of the angular velocity sensor 58 and the acceleration sensor 59.

Figure 5:
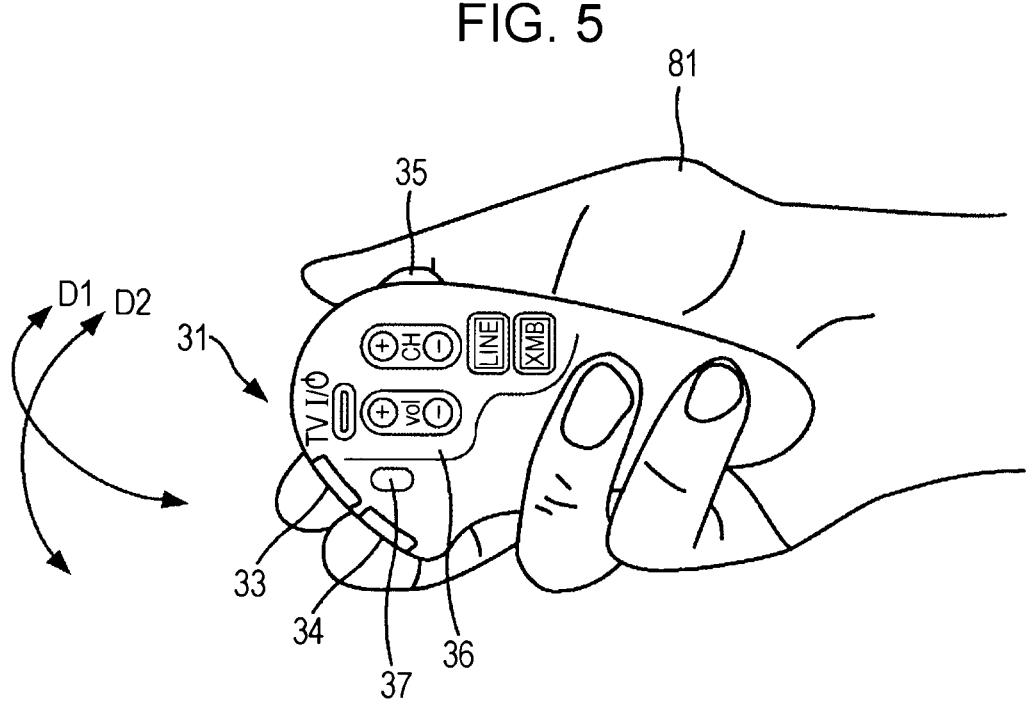
FIG. 5 is a diagram illustrating a busy state of the input device.

When the entire main body 32 is operated, for example, in the arbitrary direction D1 or D2 shown in FIG. 5 by the user typically in a state where the head (left end in FIG. 5) of the main body 32 faces the television receiver 10 (located leftward although not shown in FIG. 5) located before the main body 32, the angular velocity sensor 58 which is a biaxial oscillation type angular velocity sensor detects the angular velocities of the pitch angle and the yaw angle rotating around a pitch rotation axis 71 and a yaw rotation axis 72 which are parallel to the X and Y axes, respectively. The acceleration sensor 59 detects the acceleration in the X and Y directions. The acceleration sensor 59 can detect the acceleration as vector quantity using the sensor substrate 57 as a sensitivity plane. As the acceleration sensor 59, it is also possible to use a triaxial acceleration sensor which has three axes of X, Y, and Z axes as sensitivity axes.

The two batteries 56 supply electric power necessary for each section.

FIG. 5 shows a busy state of the input device 31. As shown in FIG. 5, a user operates the entire input device 31 in the arbitrary direction in the three-dimensional free space while holding the input device 31 with a hand 81. The input device 31 detects the operation direction and outputs an operation signal corresponding to the operation direction. In addition, the input device 31 outputs a corresponding operation signal when a button 36 other than the buttons 33 and 34 and the jog dial 35 is operated to change the volume or channel.

The button 33 may be made to correspond to the left button of a normal mouse and the button 34 may be made to correspond to the right button. The button 33 is operated by the index finger, the button 34 is operated by the middle finger, and the jog dial 35 is operated by the thumb. A command issued when a button has been operated is arbitrary. For example, the command may be set as follows.

Button 33 is pressed once: left click: selection
Long pressing of the button 33: drag: movement of an icon
Button 33 is pressed twice: double click: file and folder is opened and a program is executed
Button 34 is pressed once: right click: display of a menu
Jog dial is rotated: scroll
Jog dial is pressed: decision By such settings, the user can use the input device 31 with the same operating experience as when using a normal mouse with a personal computer.

The button 33 may also be formed as a two-stage switch. In this case, an operation signal indicating the movement of the input device 31 is output when the first-stage switch is operated or is in the pressed state, and the selection is performed when the second-stage switch is operated. Undoubtedly, a button for exclusive use may be provided so that an operation signal indicating the movement can be output when the button is operated.

A light-emitting section 37 emits light on the basis of the amount of hand shake.

[Electrical Configuration of an Input Device]

Figure 6:
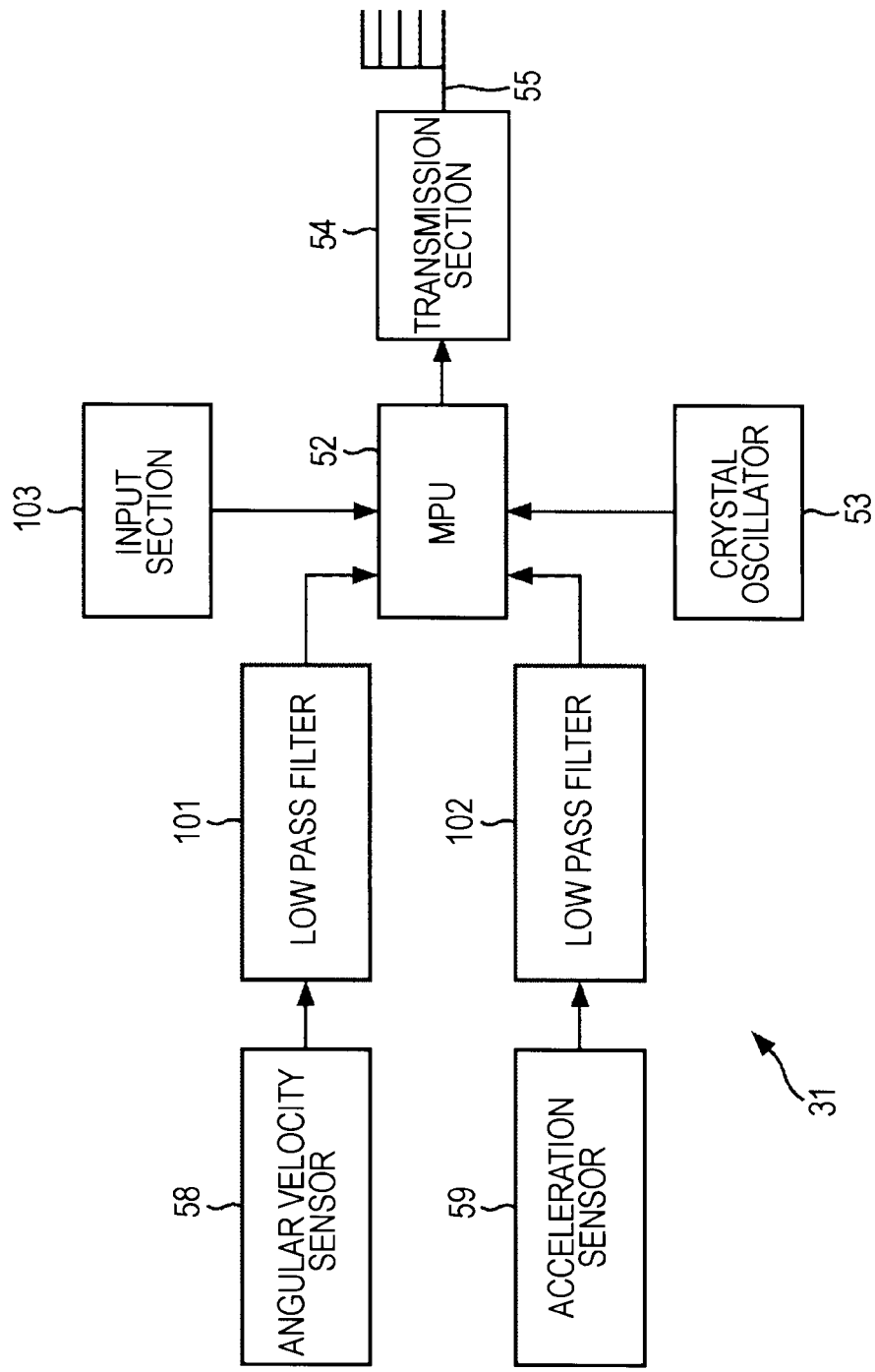
FIG. 6 is a block diagram illustrating the electrical configuration of the input device.

FIG. 6 shows the electrical configuration of the input device 31.

The angular velocity sensor 58 and the acceleration sensor 59 detect the angular velocity and the acceleration, respectively, when the entire main body 32 has been operated by the user. The detection data of the angular velocity sensor 58 is supplied to the MPU 52 after a low frequency component is extracted by a low pass filter 101. The detection data of the acceleration sensor 59 is supplied to the MPU 52 after a low frequency component is extracted by a low pass filter 102.

An input section 103 including the buttons 33 and 34, the jog dial 35, the button 36, and the like outputs a signal corresponding to the operation to the MPU 52 when the input section 103 is operated by the user. The crystal oscillator 53 generates a clock and supplies the clock to the MPU 52.

The MPU 52 generates an operation signal corresponding to the input and outputs the operation signal as a radio wave from the transmission section 54 to the television receiver 10 through the antenna 55. The television receiver 10 receives the radio wave through the antenna 11.

[Functional Configuration of an MPU]

Figure 7:
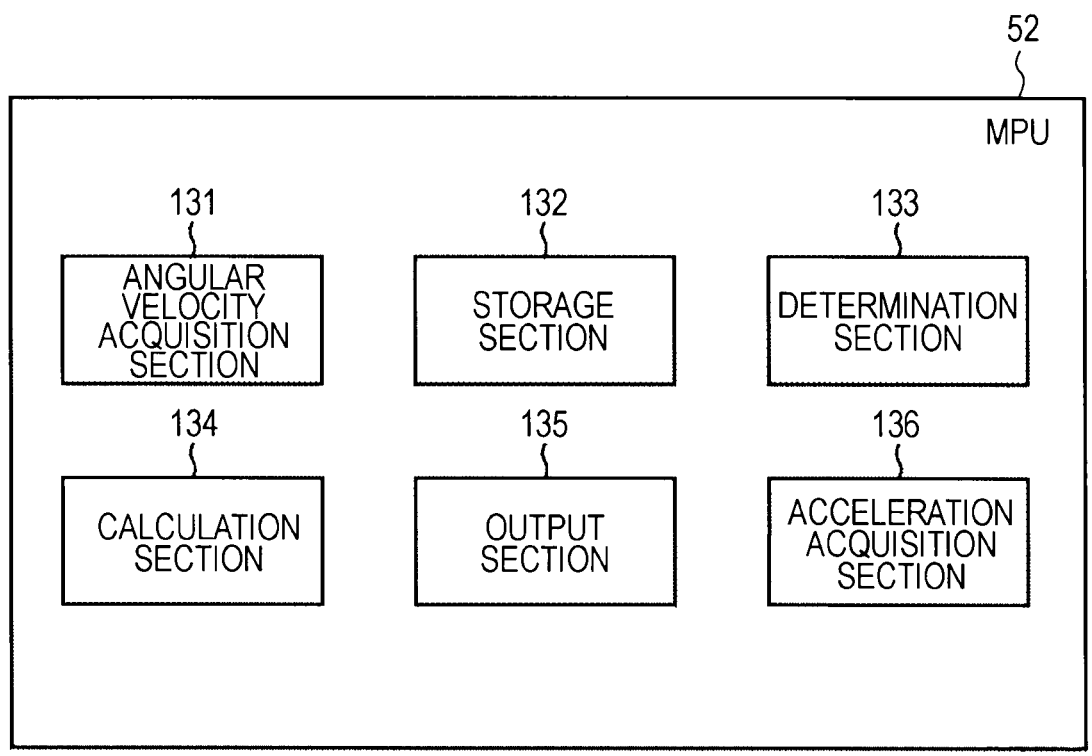
FIG. 7 is a block diagram illustrating the functional configuration of an MPU.

FIG. 7 shows the functional configuration of the MPU 52 of the input device 31. The MPU 52 has an angular velocity acquisition section 131, a storage section 132, a determination section 133, a calculation section 134, an output section 135, and an acceleration acquisition section 136.

The angular velocity acquisition section 131 acquires the angular velocity. The storage section 132 stores the angular velocity, the acceleration, and the amount of hand shake which are detected. The determination section 133 executes various kinds of determination processing. The calculation section 134 calculates the amount of hand shake or the hand shake related value. The output section 135 displays the hand shake related value or outputs the amount of hand shake by transmission, for example. The acceleration acquisition section 136 acquires the acceleration.

Figure 8:
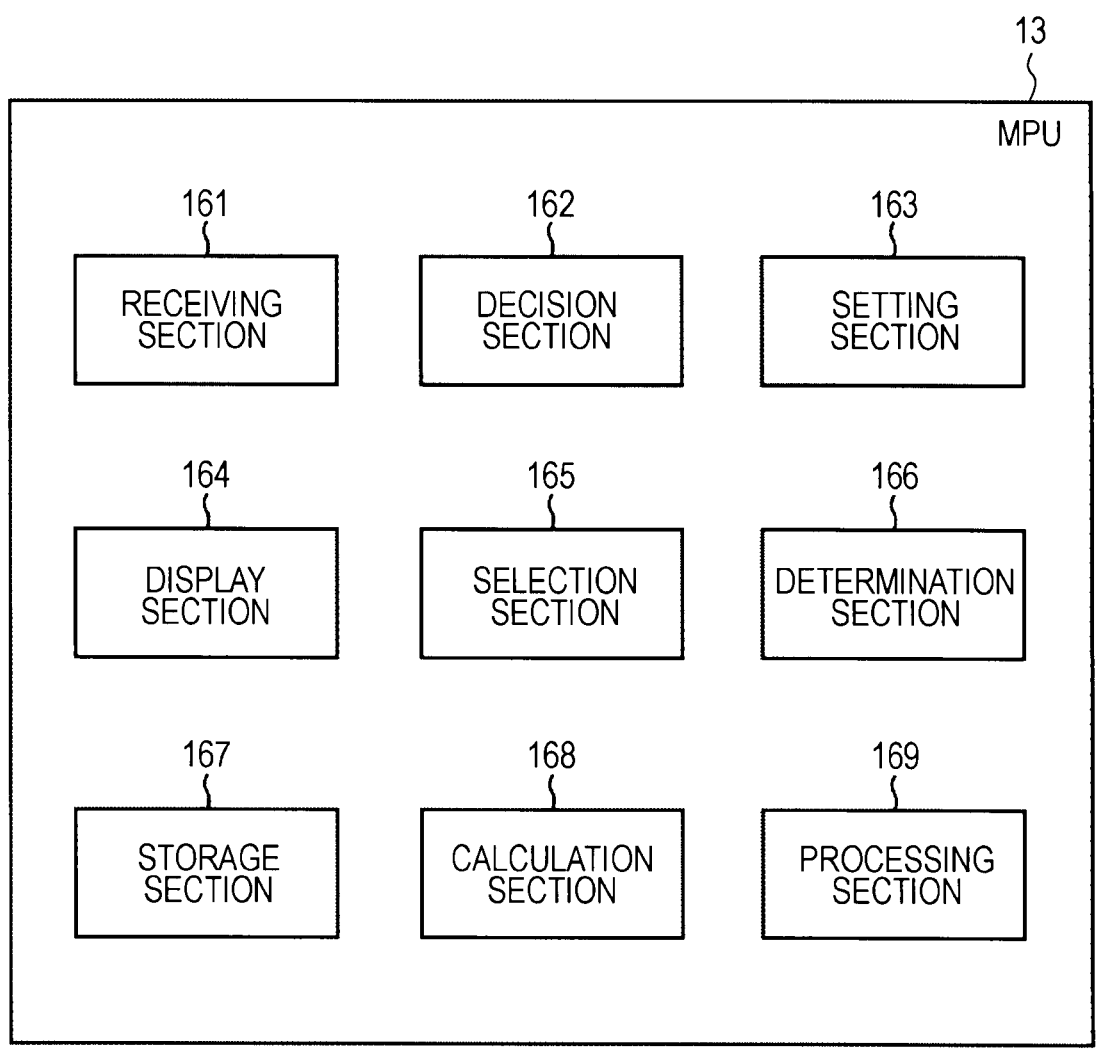
FIG. 8 is a block diagram illustrating the functional configuration of the MPU.

FIG. 8 shows the functional configuration of the MPU 13 of the television receiver 10. The MPU 13 has a receiving section 161, a decision section 162, a setting section 163, a display section 164, a selection section 165, a determination section 166, a storage section 167, a calculation section 168, and a processing section 169.

The receiving section 161 receives the hand shake related value transmitted from the input device 31. The decision section 162 decides an image to be controlled. The setting section 163 sets the size of the image to be controlled to the value corresponding to the hand shake related value. The display section 164 displays the image to be controlled and other information. The selection section 165 selects the title, genre, and the like of contents from a list. The determination section 166 performs various kinds of determination processing. The storage section 167 stores the angular velocity from the input device 31, the calculated amount of hand shake, the contents, and other information. The calculation section 168 calculates the amount of hand shake. The processing section 169 executes processing corresponding to the operation signal from the input device 31.

[First Hand Shake Related Value Output Processing of an Input Device]

Next, hand shake related value output processing of the input device 31 will be described with reference to FIG. 9. This processing is executed in a stopped state where a user holds the input device 31.

The angular velocity sensor 58 outputs the angular velocity ($\omega\psi(t)$, $\omega\theta(t)$) of movement occurring when a user holds the input device 31 in the three-dimensional free space. The angular velocity $\omega\psi(t)$ is an angular velocity around the Y axis, and the angular velocity $\omega\theta(t)$ is the angular velocity around the X axis. The low pass filter 101 removes a high frequency component, which is not necessary, and extracts a low frequency component from the angular velocity ($\omega\psi(t)$, $\omega\theta(t)$) output from the angular velocity sensor 58. In step S11, the angular velocity acquisition section 131 of the MPU 52 acquires the angular velocity ($\omega\psi(t)$, $\omega\theta(t)$) extracted by the low pass filter 101. Specifically, the angular velocity ($\omega\psi(t)$, $\omega\theta(t)$) is acquired after being A/D converted by an A/D converter built in the MPU 52.

In step S12, the storage section 132 buffers the angular velocity ($\omega\psi(t)$, $\omega\theta(t)$) acquired in step S11. In step S13, the determination section 133 determines whether or not the angular velocity is equal to or smaller than the threshold value until n-th record. That is, the storage section 132 stores the angular velocities ($\omega\psi(t)$, $\omega\theta(t)$) until the last n times whenever the processing of step S12 is repeated. It is determined whether or not the input device 31 stands still by determining whether or not all angular velocities ($\omega\psi(t)$, $\omega\theta(t)$) until the last n times are equal to or smaller than the threshold value set beforehand. In other words, the movement state regarding whether or not the input device 31 stands still is determined on the basis of the angular velocity.

A movement component, which is detected when the user has operated the input device 31 in a predetermined direction in the three-dimensional free space in order to give a command, is based on a user's intended operation and is not an original hand shake component that the user has not intended. By the processing in step S13, erroneously detecting a movement component, which occurs when the user operates the input device 31 in the predetermined direction in the three-dimensional free space, as hand shake can be prevented.

In addition, the reason why the determination is performed on the basis of multiple records is to make it difficult to be influenced by noise.

When it is determined that all angular velocities ($\omega\psi(t)$, $\omega\theta(t)$) until the last n-th record are equal to or smaller than the threshold value set beforehand, the calculation section 134 calculates the amount of hand shake S(t) from the angular velocity until the n-th record in step S14. Specifically, the calculation section 134 calculates the size of hand shake in a frequency band by performing a fast Fourier transform of the angular velocity ($\omega\psi(t)$, $\omega\theta(t)$) stored in step S12. The frequency range of hand shake is typically 1 Hz to 20 Hz. However, the frequency range of hand shake is not limited to this range. The amount of hand shake is calculated in the X and Y directions. In addition, a larger one of the amounts of hand shake in two directions can be set as the representative value. Alternatively, the sum of the two amounts of hand shake or the square root of the sum of the two amounts of hand shake may be set as the representative value.

In addition, the amount of hand shake S(t) may also be calculated by calculating the size of hand shake in the frequency band using a band pass filter, a high pass filter, or the like.

In step S15, the determination section 133 determines whether or not the amount of hand shake S(t) calculated in step S14 is equal to or smaller than the threshold value. When the amount of hand shake S(t) is larger than the threshold value, the possibility that the input device 31 will not be placed on a table but will be held by the user is high. In this case, in step S16, the storage section 132 buffers the amount of hand shake S(t) calculated by the processing in step S14.

It may be detected that the input device 31 is placed on the table using a touch sensor, a switch, or the like. For example, a button for determining whether or not a pointer is movable may be provided in the input device 31 so that it is determined that the input device 31 is held by the user (not placed on the table) when it is indicated that the pointer is movable. In addition, it may also be detected that the input device 31 is placed on the table if the movement of the input device 31 has not been detected for a predetermined time.

When the amount of hand shake S(t) is sufficiently small, the input device 31 is placed on the table. Accordingly, a possibility that the amount of hand shake S(t) calculated in this case will be noise (that is, will not be hand shake) is high. Then, when it is determined that the amount of hand shake S(t) is equal to or smaller than the threshold value in step S15 (that is, when the input device 31 is placed on the table), the processing in step S16 is skipped. In this way, the amount of hand shake S(t) can be correctly calculated.

When it is determined that the angular velocity until the n-th record is larger than the threshold value in step S13, the processing in steps S14 to S16 is skipped. Accordingly, as described above, it can be prevented that a movement component, which occurs when the user operates the input device 31 in the predetermined direction in the three-dimensional free space, is erroneously detected as hand shake.

In step S17, the calculation section 134 calculates the hand shake related value from the buffered amount of hand shake. That is, the value corresponding to the amount of hand shake is calculated as the hand shake related value. Any value corresponding to the amount of hand shake may be set as the hand shake related value. For example, the hand shake related value may be set by averaging the plurality of amounts of hand shake stored and extracting a direct component. Alternatively, the value expressed in two steps, such as "hand shake•no hand shake" or "large amount of hand shake•small amount of hand shake", the value expressed in three steps, such as "large amount of hand shake•middle amount of hand shake•small amount of hand shake" or "large amount of hand shake•small amount of hand shake•no amount of hand shake", or the value expressed in multiple steps may be set as the hand shake related value. Undoubtedly, the amount of hand shake itself may also be set as the hand shake related value. In addition, a command corresponding to the amount of hand shake may be set as the hand shake related value.

In step S18, the output section 135 displays the hand shake related value. That is, the hand shake related value is displayed by making the light-emitting section 37 emit light. For example, emission of the light-emitting section 37 may be controlled according to the existence of shake such that the light-emitting section 37 emits light when the user holds the input device 31 and is turned off when the input device 31 is placed on the table. In addition, the light-emitting section 37 may be turned off when a predetermined time has passed after emission of the light-emitting section 37. Moreover, the light-emitting section 37 may be made to emit light again after the light-emitting section 37 was turned off, corresponding to "large amount of hand shake•small amount of hand shake•no amount of hand shake", when the amount of hand shake becomes large by a user's operation of shaking the input device 31 with the input device 31 held. By making the light-emitting section 37 emit light in this way, it becomes easy to find operation buttons even in a gloomy place, such as in a home theater. As a result, it becomes easy to use the input device 31.

According to the hand shake related value, the emission state of the light-emitting section 37 may be changed. For example, according to the size of hand shake, the brightness or the color of light may be changed in a stepwise manner or the flickering interval may be changed. In addition, the size of hand shake itself may be displayed like a level meter.

When the input device 31 is used as a mouse with a personal computer for presentations, the user can check whether or not the hand shake has occurred due to stress by observing the emission state of the light-emitting section 37. When the hand shake has been confirmed, it is possible to improve concentration or alleviate stress by concentrating on making the hand shake smaller.

Moreover, the user may intentionally make hand shake occur in the input device 31 for fun.

In addition, shaking of a hand may occur as symptoms of patients, such as Parkinson's disease, drug-induced tremor, and toxic tremor. Therefore, the user may use the input device 31 to find symptoms of such diseases by comparing the emission state of the light-emitting section 37 with the user's operation intention.

In step S19, the output section 135 transmits the hand shake related value. That is, the hand shake related value calculated in step S17 is modulated by the transmission section 54 and is then transmitted as an operation signal for remote control from the antenna 55 to the television receiver 10 by a radio wave.

Then, the process returns to step S11 and the subsequent process is repeatedly executed.

In addition to displaying the hand shake related value by making the light-emitting section 37 of the input device 31 emit light, the hand shake related value may be displayed on a display section of the television receiver 10.

When the input device 31 is placed on a table, the angular velocity sensor 58 the power consumption of which is large may be set to a sleep state, or it is possible to stop the supply of electric power and set only the acceleration sensor 59, the power consumption of which is small, to an operation state. In this case, the power consumption of the battery 56 can be suppressed.

In the present embodiment, since the output processing of the hand shake related value is executed in a state where the input device 31 stands still, the influence based on the operation of the input device 31 in the three-dimensional space can be reduced.

[Display Control Processing of a Television Receiver]

Figure 9:
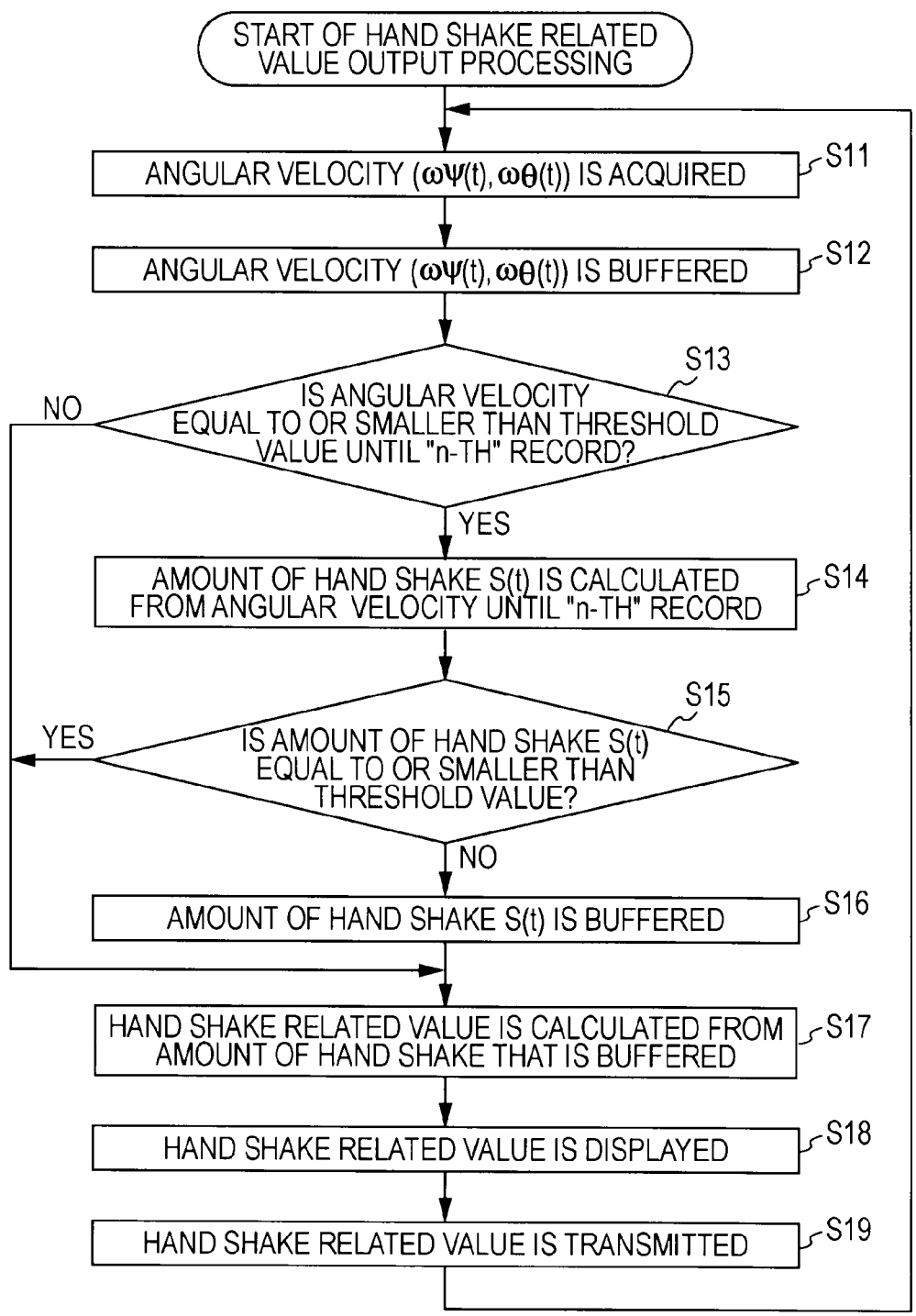
FIG. 9 is a flow chart illustrating the hand shake related value output processing.
Figure 10:
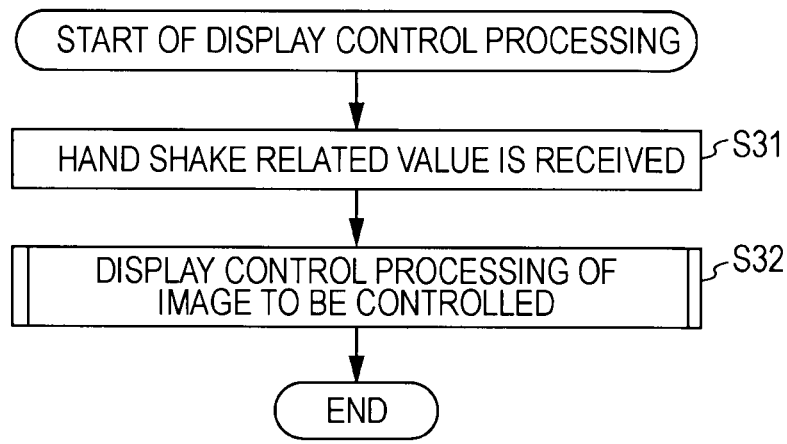
FIG. 10 is a flow chart illustrating the display control processing.

In response to the above-described operation of the input device 31 in FIG. 9, display control processing shown in FIG. 10 is executed by the television receiver 10.

That is, in step S31, the receiving section 161 receives a hand shake related value. Specifically, the hand shake related value which has been transmitted from the input device 31 in the processing of step S19 of FIG. 9 is received by the receiving section 12 through the antenna 11, is modulated, and is acquired by the MPU 13.

In step S32, display control processing of an image to be controlled is executed.

[First Display Control Processing for an Image to be Controlled of a Television Receiver]

Hereinafter, an example of display control processing of an image to be controlled in step S32 of FIG. 10 will be described.

Figure 11:
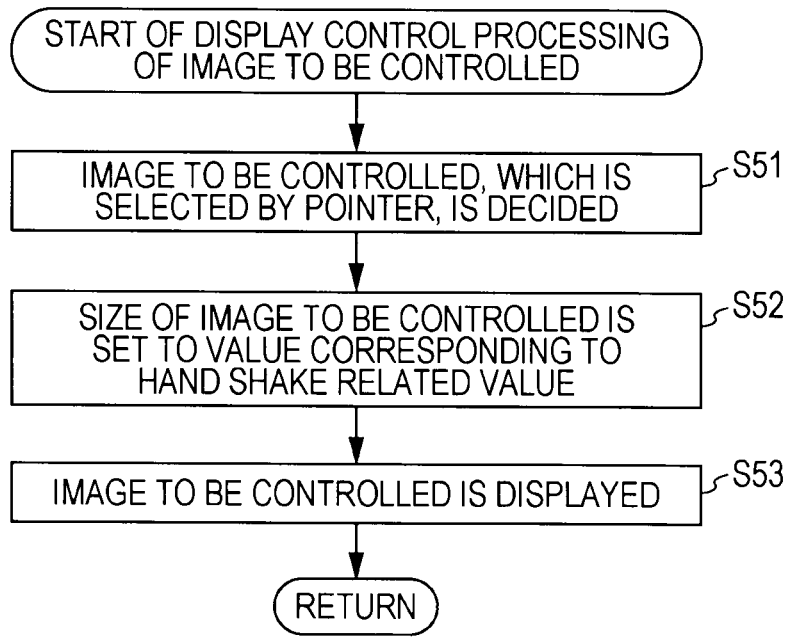
FIG. 11 is a flow chart illustrating the display control processing of an image to be controlled.

FIG. 11 is a flow chart illustrating display control processing of an image to be controlled.

Figure 12A:
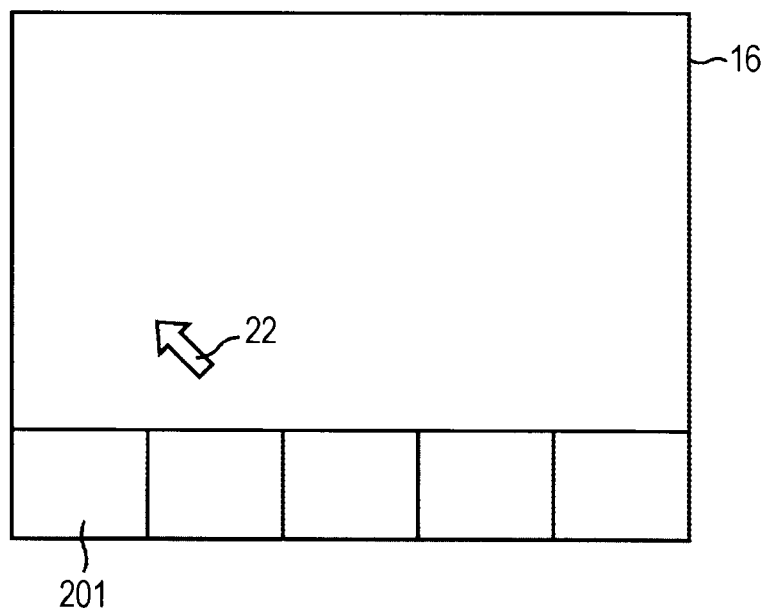
FIGS. 12A and 12B are diagrams illustrating the display control processing of an image to be controlled.

In the example shown in FIG. 11, the decision section 162 decides an image to be controlled, which is selected by a pointer, in step S51. For example, as shown in FIG. 12A, it is assumed that a plurality of small selection screens 201 (in the case shown in FIG. 12A, five selection screens 201) for selecting contents are displayed along the lower side of the image display section of the output section 16. Still images or moving images with various contents, such as movies and documents, are displayed on each selection screen 201. In addition, when the contents selected by the pointer 22 from the five selection screens 201 are displayed in one large area above the five selection screens 201, the selection screen 201 is set as an image to be controlled.

In step S52, the setting section 163 sets the size of the image to be controlled to the value corresponding to the hand shake related value. For example, when the hand shake related value received in step S31 indicates that the hand shake is large, the size of the image to be controlled is set to become large.

In step S53, the display section 164 displays the image to be controlled. That is, the image to be controlled is displayed in the size set in step S52.

[First Example of an Image to be Controlled]

Figure 12B:
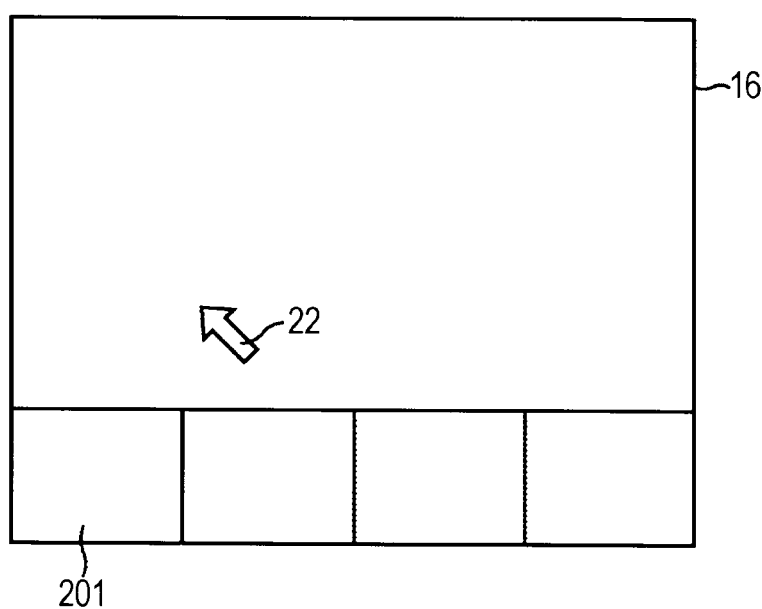

For example, when the hand shake related value indicates that the hand shake is large, the selection screen 201 as an image to be controlled is changed from the small size shown in FIG. 12A to the large size as shown in FIG. 12B. The five selection screens 201 displayed in FIG. 12A are changed to four selection screens in the example shown in FIG. 12B.

The amount of information displayed in this way decreases, but the size of the selection screen 201 becomes large. As a result, since it becomes easy to locate the pointer 22 on the one desired selection screen 201 even if the hand shake of the input device 31 is large, the user can select the selection screen 201 quickly and correctly.

[Second Example of an Image to be Controlled]

Figure 13A:
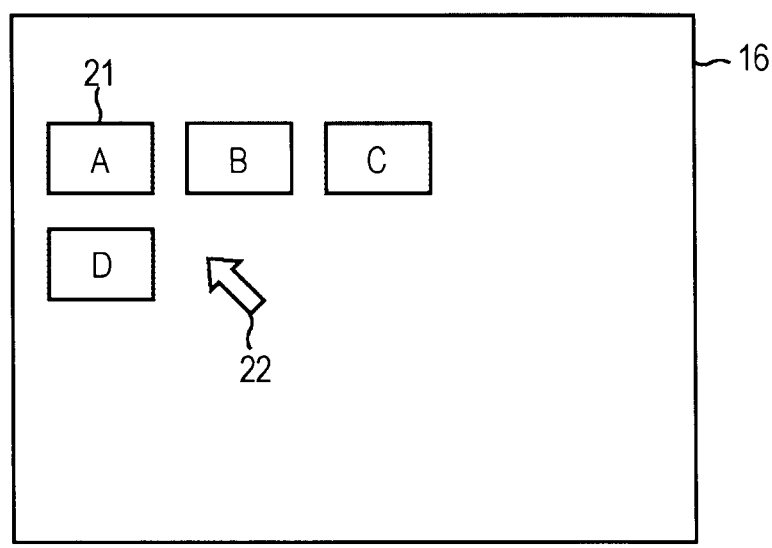
FIGS. 13A and 13B are diagrams illustrating the display control processing of an image to be controlled.
Figure 13B:
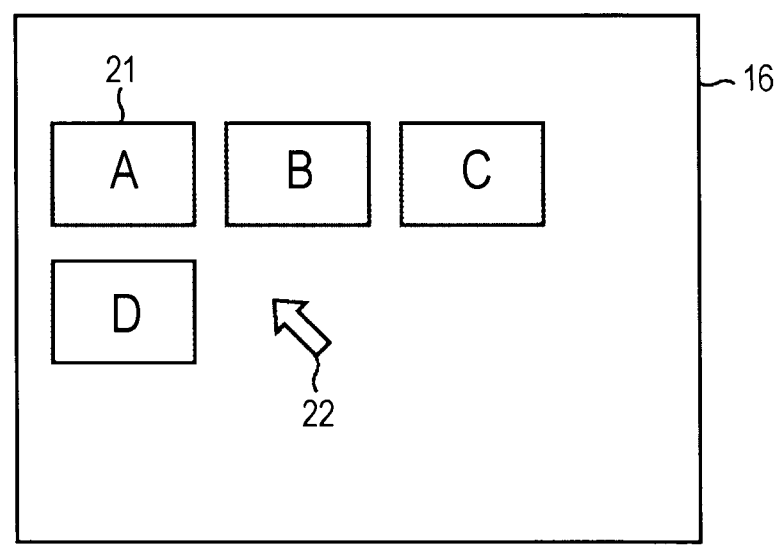

FIGS. 13A and 13B show another example of the image to be controlled. In this example, the four icons 21 as images to be controlled are displayed on the image display section as shown in FIG. 13A. Characters A to D are displayed on the four icons 21, respectively. When the hand shake related value indicates that the hand shake is large, the icons 21 are changed from the small size shown in FIG. 13A to the large size as shown in FIG. 13B. The characters A to D, figures, and the like within the icons 21 are also changed to the large sizes.

Accordingly, also in this case, even if the hand shake of the input device 31 is large, the user can check the desired icon 21 quickly and then locate the pointer 22 on the icon 21. As a result, the user can select the desired icon 21 quickly and correctly.

[Third Example of an Image to be Controlled]

Figure 14A:
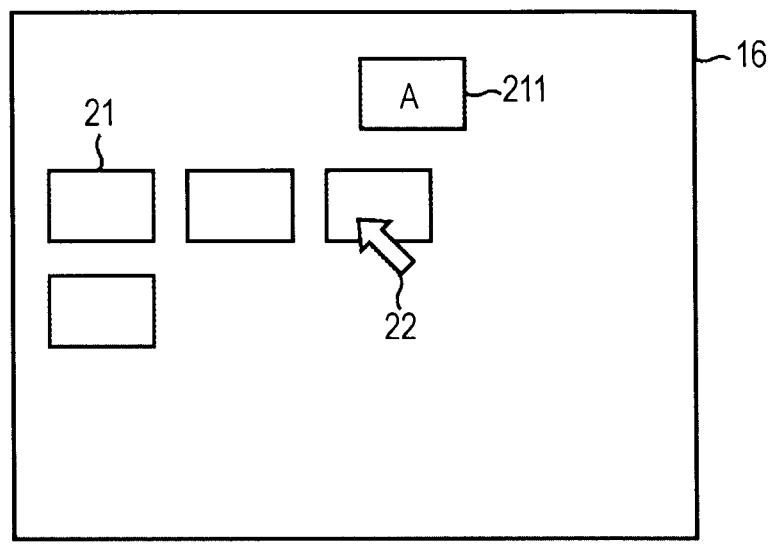
FIGS. 14A and 14B are diagrams illustrating the display control processing of an image to be controlled.
Figure 14B:
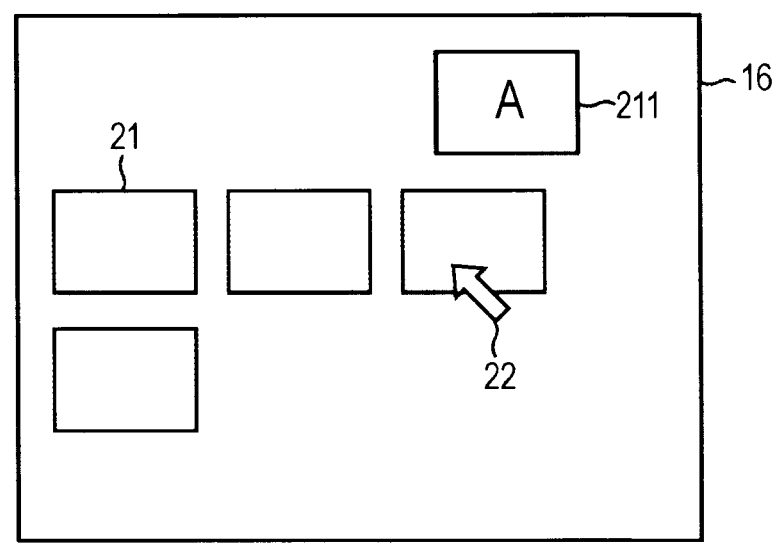

FIGS. 14A and 14B show still another example of the image to be controlled. In this example, the pointer 22 is placed on one of the plurality of icons 21 as images to be controlled, which are displayed on the image display section, as shown in FIG. 14A. As a result, a menu 211 illustrating the function of the icon is displayed near the icon 21 where the pointer 22 is located. In FIG. 14A, the explanation is schematically expressed as a character "A".

When the hand shake related value indicates that the hand shake is large, the size of the menu 211 and the character "A" displayed in the menu 211 are changed from the small size shown in FIG. 14A to the large size as shown in FIG. 14B.

Accordingly, also in this case, even if the hand shake of the input device 31 is large, the user can check the desired icon 21 quickly and then locate the pointer 22 on the icon 21. As a result, the user can select the desired icon 21 quickly and correctly.

[Fourth Example of an Image to be Controlled]

Figure 15A:
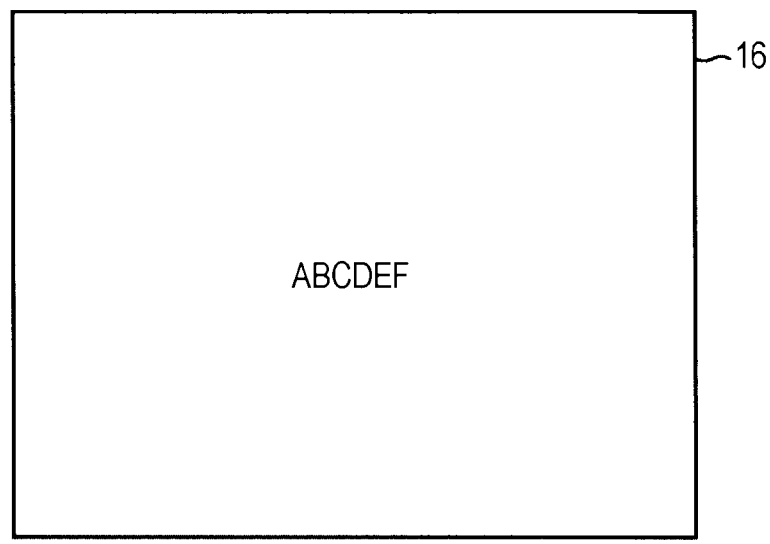
FIGS. 15A and 15B are diagrams illustrating the display control processing of an image to be controlled.
Figure 15B:
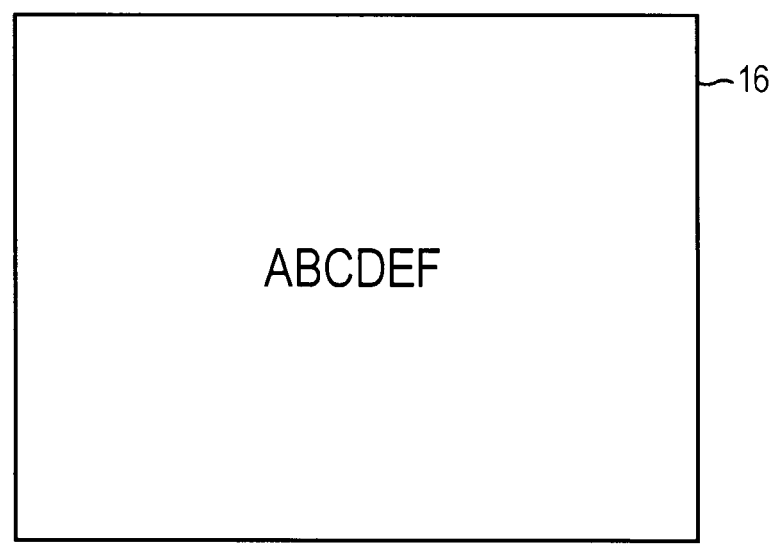

FIGS. 15A and 15B show still another example of the image to be controlled. In this example, characters "ABCDEF" are displayed on the screen of the image display section. When the hand shake related value indicates that the hand shake is large, these characters "ABCDEF" as an image to be controlled are changed from the small size shown in FIG. 15A to the large size as shown in FIG. 15B.

Accordingly, also in this case, even if the hand shake of the input device 31 is large, the user can check the desired information quickly and select the desired information quickly and correctly with the pointer 22.

As described above, the example has been illustrated in which the size of an image to be controlled is changed according to the size of hand shake. However, it is not necessary to uniformly change the size of an icon on the screen like the above-described example. For example, when a pointer approaches an icon, only the icon may be enlarged so that the icon is easily selected. That is, the accuracy of selection can be improved by enlarging the icon at the time of enlargement according to an increase in the hand shake.

In addition, the distance between a plurality of icons as images to be controlled may be changed according to the size of hand shake. That is, the accuracy of selection can also be improved by increasing the distance between adjacent icons when the hand shake is large.

In addition, an application may also be considered in which the operable range for selection of an icon is changed according to the size of hand shake. For example, GUI may be considered in which the periphery of an icon is highlighted when a pointer approaches the icon and the icon can be selectively operated when the pointer goes into the range including the highlight portion. In other words, the operability can be improved by enlarging the highlight portion according to an increase in the hand shake, that is, by increasing the operable range for selection of an icon as an image to be controlled according to an increase in the hand shake.

In addition, the sensitivity in movement of a pointer which is an image to be controlled may be changed according to the size of hand shake. That is, the accuracy of information selection using the pointer can be improved by decreasing the movement of the pointer with respect to the movement of a hand when the hand shake is large.

[Second Display Control Processing for an Image to be Controlled of a Television Receiver]

Figure 16:
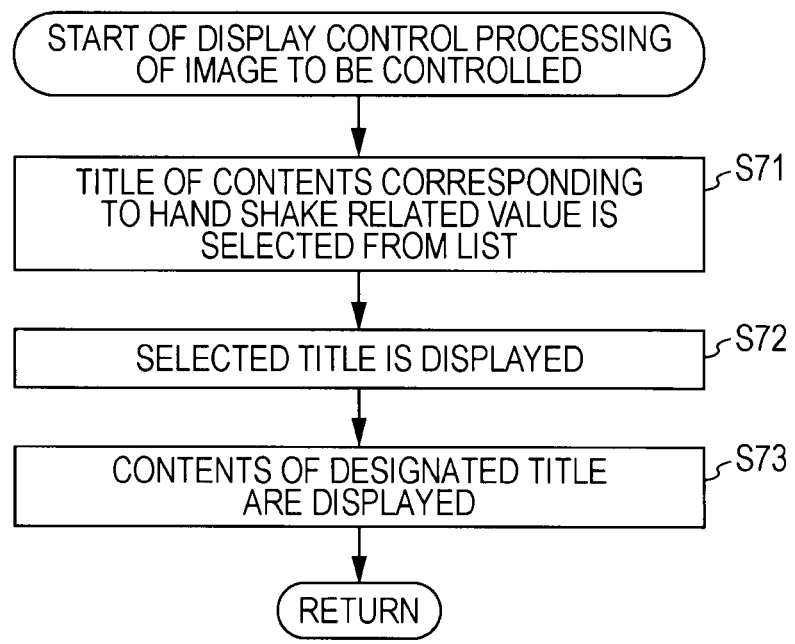
FIG. 16 is a flow chart illustrating the display control processing of an image to be controlled.

FIG. 16 is a flow chart illustrating another example of the display control processing for an image to be controlled in step S32 of FIG. 10. In this example, the title of contents as an image to be controlled is selected on the basis of the hand shake related value.

In step S71, the selection section 165 selects the title of contents corresponding to the hand shake related value from the list. That is, the storage section 167 stores a database of contents. For example, as shown in FIG. 17, the list of contents is included in the database. In this list, the hand shake related value is stored so as to match the contents.

In the list shown in FIG. 17, title, type, and genre subgenre of contents, other related information groups, and hand shake related value are stored so as to match each other. The type indicates to which type, such as video or music, the contents correspond. The genre•subgenre indicates that the contents belong to a genre called a movie and a subgenre called violence, a genre called a document and a subgenre called history, or a genre called sports and a subgenre called soccer or indicates that the contents belong to a genre, such as rock or pop. Other related information groups are also matched with the contents.

In addition, the hand shake related values of 1, 4, 2, 1, and 3 are matched with the contents. Since the smaller the number is, the user is in the more excited state, the smaller number means contents which are more suitable for the case when the hand shake is large. In other words, since the hand shake related value indicates the degree of relax of the user when provided to the user, the suitable contents information among the database of contents can be provided to the user according to the degree of relax of the user at that time. Contents and hand shake related values may be provided in a state of being matched with the provider of the contents, or the user may match the contents and the hand shake related values with each other.

Figures 18, 19:
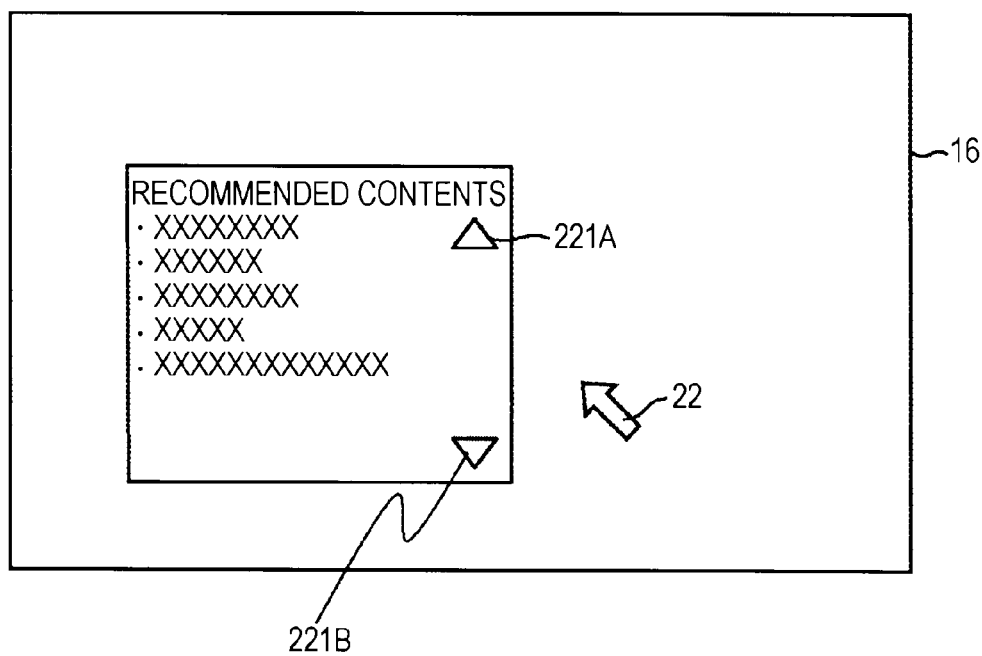
FIG. 18 is a diagram illustrating the ranking of the hand shake related value.
FIG. 19 is a diagram illustrating the display control processing of an image to be controlled.

The selection section 165 selects, from a list, contents close to the hand shake related value received from the input device 31 in step S31 of FIG. 10. For example, as shown in FIG. 18, when the hand shake related value received from the input device 31 is 1, contents whose hand shake related value is 1 are selected first. Then, contents with the hand shake related value close to the value (in this case, the value 1) are selected in order of smaller numbers. That is, contents with the hand shake related value of 2 and contents with the hand shake related value of 3 are sequentially selected. Then, contents with the hand shake related value of 4 and contents with the hand shake related value of 5 are sequentially selected. In addition, the hand shake related values are classified into five steps in the example shown in FIG. 18.

When the hand shake related value received from the input device 31 is 2, contents whose hand shake related value is 2 are selected first. Then, contents with the hand shake related value close to the value (in this case, the value 2) are selected in order of smaller numbers. That is, contents with the hand shake related value of 1 and contents with the hand shake related value of 3 are sequentially selected. Then, contents with the hand shake related value of 4 and contents with the hand shake related value of 5 may be sequentially selected.

When the hand shake related value received from the input device 31 is 3, contents whose hand shake related value is 3 are selected first. Then, contents with the hand shake related value close to the value (in this case, the value 3) are selected in order of smaller numbers. That is, contents with the hand shake related value of 2 and contents with the hand shake related value of 4 are sequentially selected. Then, contents with the hand shake related value of 1 and contents with the hand shake related value of 5 may be sequentially selected.

In step S72, the display section 164 displays titles selected in step S71. That is, the titles which are selected in the processing of step S71 and are ranked are displayed.

Thus, selection of the contents display order in the list of contents is controlled by the hand shake related value.

[Fifth Example of an Image to be Controlled]

FIG. 19 shows a display example in this case. In this example, as "recommended contents", titles of contents having hand shake related values close to the value received from the input device 31 are displayed in order of values close to the value. The user scrolls the displayed title in the upper or lower direction by operating an up scroll button 221A or a down scroll button 221B. In addition, the user selects and designates desired contents with the pointer 22.

In step S73, the display section 164 displays the contents of the designated title. That is, the contents of the title designated by the user are displayed on the image display section of the output section 16.

[Third Display Control Processing for an Image to be Controlled of a Television Receiver]

Figure 20:
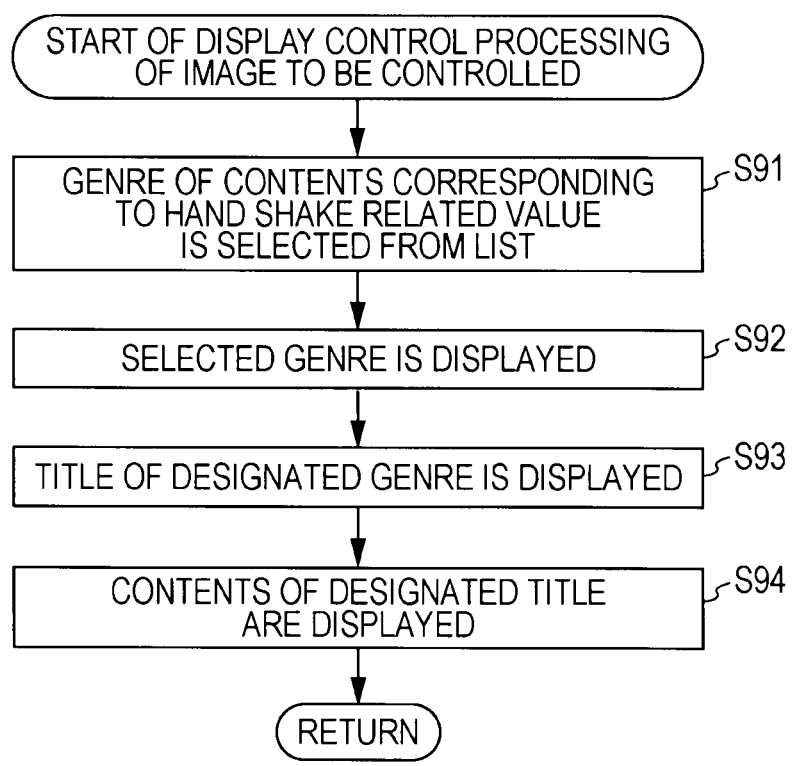
FIG. 20 is a flow chart illustrating the display control processing of an image to be controlled.

FIG. 20 is a flow chart illustrating still another example of the display control processing for an image to be controlled in step S32 of FIG. 10. In this example, the genre of contents as an image to be controlled is selected on the basis of the hand shake related value.

In step S91, the selection section 165 selects the genre of contents corresponding to the hand shake related value from the list. That is, in the storage section 167, a database of contents shown in FIG. 21A and a table shown in FIG. 21B are prepared, for example.

In the present embodiment, title, type, and genre•subgenre of contents, and other related information groups are stored in the database of the contents shown in FIG. 21A.

In the table shown in FIG. 21B, a genre of the database is matched with the hand shake related value. In this example, the hand shake related value of a video of a subgenre called the violence of a genre called a movie is set to "1". The hand shake related value of a video of a subgenre called love of a genre called a movie is set to "4". The hand shake related value of a video of a subgenre called SF of a genre called a movie is set to "2". The hand shake related value of music of a genre called rock is set to "1". The hand shake related value of music of a genre called pop is set to "3".

In case of preparing the hand shake related value in the database beforehand like the embodiment shown in FIG. 17, it is necessary to create a database for exclusive use. In contrast, in case of preparing the hand shake related value as a separate table as shown in FIGS. 21A and 212, only a table may be newly created and an existing database created by the provider of the contents, for example, may be used as the database itself.

In step S92, the display section 164 displays the genre selected in step S91. That is, the genre which is selected in the processing of step S91 and is prioritized is displayed. The user selects and designates a desired genre with the pointer 22.

In step S93, the display section 164 displays titles of the designated genre. That is, when a genre is designated, titles of the designated genre are displayed on the image display section of the output section 16. The user selects and designates a desired title with the pointer 22.

In step S94, the display section 164 displays the contents of the designated title. That is, the contents of the designated title are displayed on the image display section of the output section 16.

[Sixth Example of an Image to be Controlled]

FIG. 22 shows a display example in the processing of FIG. 20. In this example, an icon 231 showing a genre is horizontally displayed in an upper portion of the screen. In this example, the icons 231 showing genres of movie, music, and NEWS are displayed. A genre of the value close to the hand shake related value of the user is displayed on the left in the drawing. The user locates the pointer 22 on a desired icon by operating the input device 31. A pull-down menu 232 is displayed on the icon 231 (in the example shown in FIG. 20, the icon 231 of a movie) designated by the pointer 22, and titles of contents of the genre are displayed in the icon 231. The titles are displayed from top to bottom in order of hand shake related values close to the value received from the input device 31.

Also in this case, the user scrolls the display of titles in the upper or lower direction by operating the up scroll button 221A or the down scroll button 221B. In addition, the user selects and designates desired contents with the pointer 22. The contents of the designated title are displayed.

[Hand Shake Measurement Processing of a Television Receiver]

Figure 23:
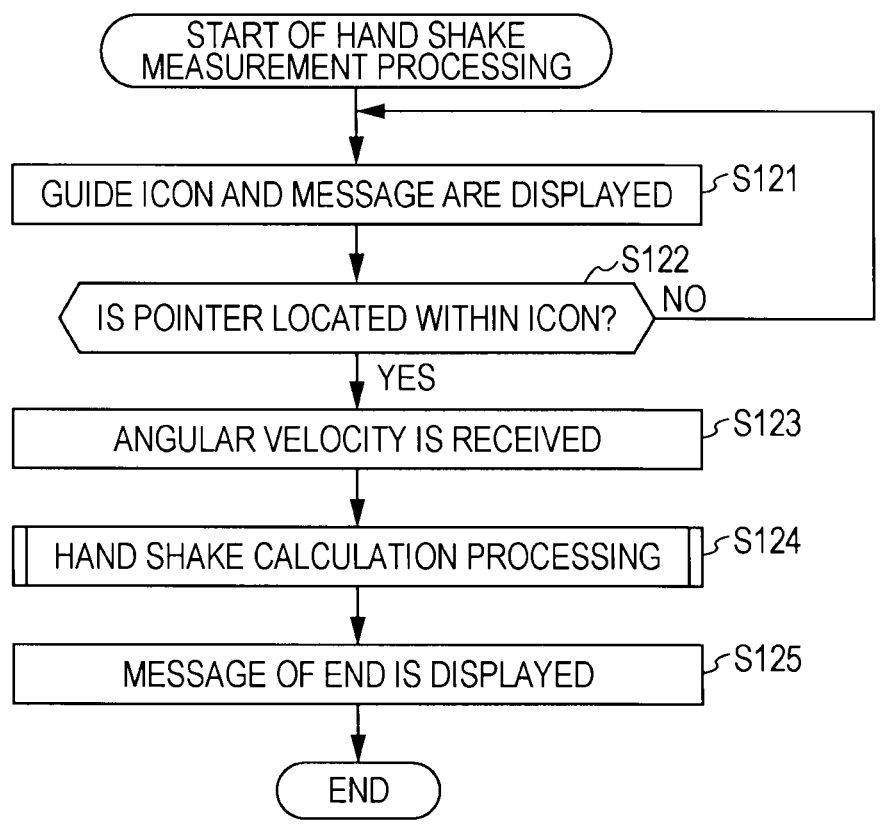
FIG. 23 is a flow chart illustrating the hand shake measurement processing.

In the above explanation, the hand shake is measured at the side of the input device 31. However, the hand shake may also be measured at the side of the television receiver 10. In addition, in order to make a user perform an operation of stopping the input device 31, a message of guiding the operation may be displayed. FIG. 23 is a flow chart illustrating the hand shake measurement processing in this case. This processing starts when a user instructs hand shake measurement. Accordingly, a button for exclusive use may be provided in the input device 31.

Figure 24A:
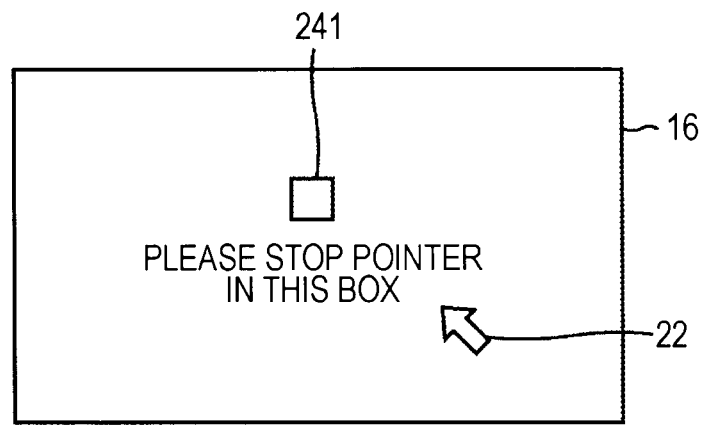
FIGS. 24A to 24C are diagrams illustrating display examples of measurement guide.
Figure 24B:
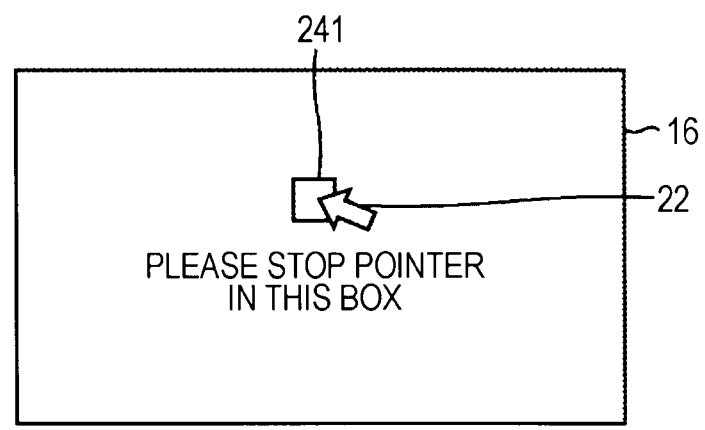

In step S121, the display section 164 displays guide icon and message. FIG. 24A shows a display example in this case. In this example, a message "please stop a pointer in this box" is displayed below a rectangular icon 241 for guiding measurement of the amount of hand shake. According to the message, the user holds and operates the input device 31 in the three-dimensional free space to thereby locate the pointer 22 in the icon 241, which guides measurement of the amount of hand shake, as shown in FIG. 24B.

In step S122, the determination section 166 determines whether or not the pointer is located within the icon. The processing of steps S121 and S122 is repeated until it is determined that the pointer 22 is located within the icon 241.

When it is determined that the pointer 22 is located within the icon 241, the receiving section 161 receives the angular velocity from the input device 31 in step S123.

Figure 25:
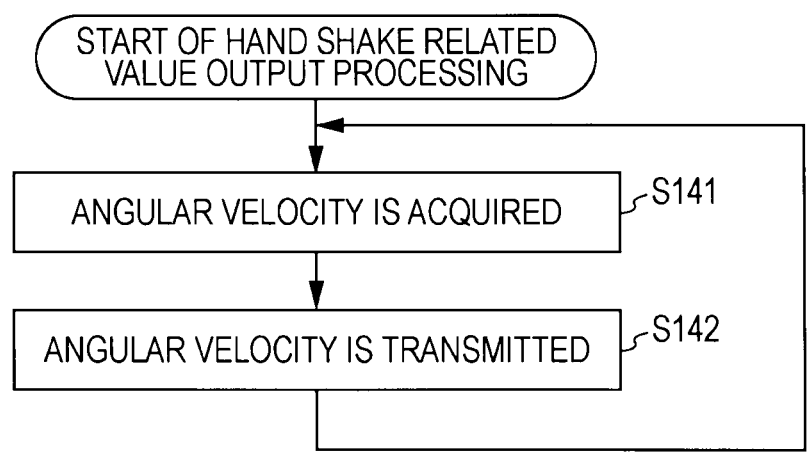
FIG. 25 is a flow chart illustrating the hand shake related value output processing.

That is, in the present embodiment, the input device 31 executes the hand shake related value output processing shown in the flow chart of FIG. 25.

In step S141, the angular velocity acquisition section 131 acquires the angular velocity. In step S142, the output section 135 transmits the acquired angular velocity. That is, in the present embodiment, the angular velocity itself is transmitted to the television receiver 10 as a hand shake related value.

Thus, the input device 31 repeats the processing for acquiring and transmitting the angular velocity. When it is determined that the pointer 22 is located within the icon 241, the receiving section 161 of the television receiver 10 receives the angular velocity from this input device 31 in step S123 shown in FIG. 23.

In step S124, hand shake calculation processing is executed. The hand shake related value is calculated by this processing and is then stored, and details of the hand shake calculation processing will be described later with reference to FIG. 26.

Figure 24C:
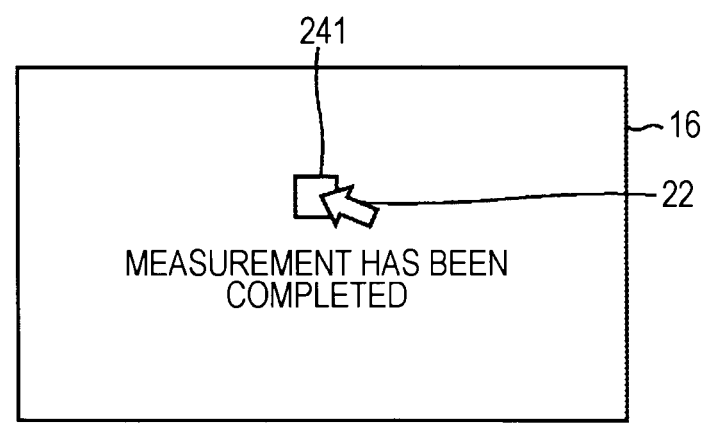

In step S125, the display section 164 displays an end message. That is, when the calculation of the hand shake related value has been completed, a message "measurement has been completed" is displayed as shown in FIG. 24C. Accordingly, the user can see that the measurement processing has been completed.

After the hand shake related value is calculated and stored as described above, the same processing as the display control processing of an image to be controlled in step S32 of FIG. 10 is executed on the basis of the value.

As described above, if the guide icon 241 is displayed and the pointer 22 is located in the icon 241 in order to measure the hand shake related value, the user stops the input device 31 surely. Accordingly, the amount of hand shake can be measured more accurately.

In addition, in the case of a configuration where two-way communication between the input device 31 and the television receivers 10 is possible, the following method may be adopted. That is, the television receiver 10 determines whether or not the pointer 22 has stopped in the guide icon 241 for a predetermined period of time. When it is determined that the pointer 22 has stopped in the guide icon 241 for a predetermined period of time, a signal indicating that the measurement of hand shake has been completed is transmitted from the television receiver 10 to the input device 31. On the basis of this signal, the amount of hand shake immediately before that can be calculated by the input device 31.

[Hand Shake Calculation Processing]

Figure 26:
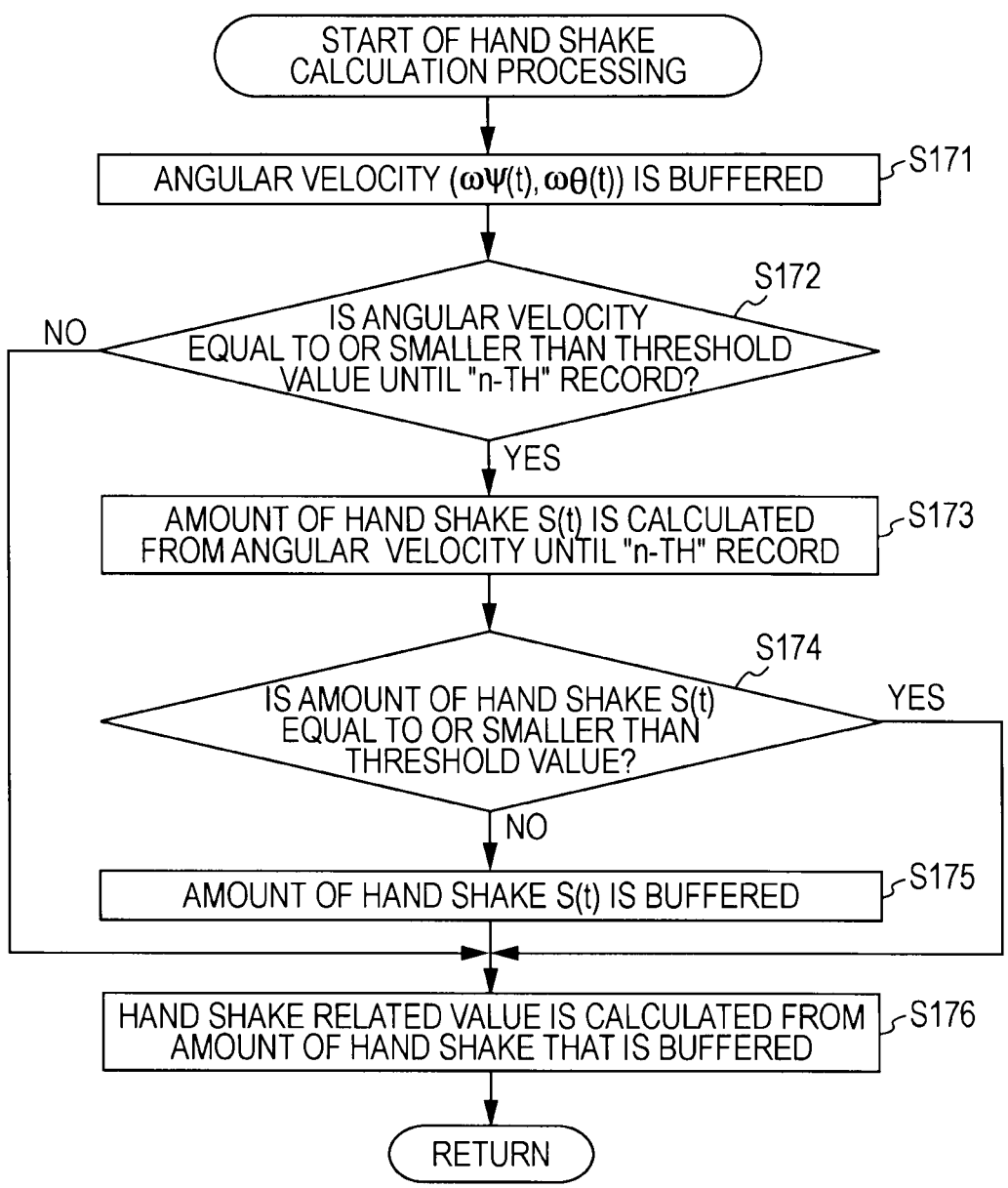
FIG. 26 is a flow chart illustrating the hand shake calculation processing.

Next, hand shake calculation processing which is performed by the MPU 13 of the television receiver 10 in step S124 of FIG. 23 will be described with reference to FIG. 26.

In step S171, the storage section 167 of the MPU 13 buffers the angular velocity ($\omega\psi(t)$, $\omega\theta(t)$) received and acquired in step S123 of FIG. 23. In step S172, the determination section 166 determines whether or not the angular velocity is equal to or smaller than the threshold value until n-th record. That is, the storage section 167 stores the angular velocities ($\omega\psi(t)$, $\omega\theta(t)$) until the last n times whenever the processing of step S171 is repeated. It is determined whether or not the input device 31 stands still by determining whether or not all angular velocities ($\omega\psi(t)$, $\omega\theta(t)$) until the last n times are equal to or smaller than the threshold value set beforehand. In other words, the movement state regarding whether or not the input device 31 stands still is determined on the basis of the angular velocity.

A movement component, which is detected when the user has operated the input device 31 in a predetermined direction in the three-dimensional free space in order to give a command, is based on a user's intended operation and is not a hand shake component that the user has not intended. By the processing in step S172, it can be prevented that a movement component, which occurs when the user operates the input device 31 in the predetermined direction in the three-dimensional free space, is erroneously detected as a hand shake component.

In addition, the reason why the determination is performed on the basis of records of multiple times is to make it difficult to be influenced by noise.

When it is determined that all angular velocities ($\omega\psi(t)$, $\omega\theta(t)$) until the last n-th record are equal to or smaller than the threshold value set beforehand, the calculation section 168 calculates the amount of hand shake S(t) from the angular velocity until the n-th record in step S173. Specifically, the calculation section 168 calculates the size of hand shake in a frequency band by performing fast Fourier transform of the angular velocity ($\omega\psi(t)$, $\omega\theta(t)$) stored in step S171. The frequency range of hand shake is typically 1 Hz to 20 Hz.

However, the frequency range of hand shake is not limited to this range. The amount of hand shake is calculated in the X and Y directions. In addition, a larger one of the amounts of hand shake in two directions can be set as the representative value. Alternatively, the sum of the two amounts of hand shake or the square root of the sum of the two amounts of hand shake may be set as the representative value.

In addition, the amount of hand shake S(t) may also be calculated by calculating the size of hand shake in the frequency band using a band pass filter, a high pass filter, or the like.

In step S174, the determination section 166 determines whether or not the amount of hand shake S(t) calculated in step S173 is equal to or smaller than the threshold value. When the amount of hand shake S(t) is larger than the threshold value, a possibility that the input device 31 will not be placed on a table but will be held by the user is high. In this case, in step S175, the storage section 167 buffers the amount of hand shake S(t) calculated by the processing in step S173.

When the amount of hand shake S(t) is sufficiently small, the input device 31 is placed on the table. Accordingly, a possibility that the amount of hand shake S(t) calculated in this case will be a noise is high. Then, when it is determined that the amount of hand shake S(t) is equal to or smaller than the threshold value in step S174, the processing in step S175 is skipped. In this way, the amount of hand shake S(t) can be correctly calculated.

Also when it is determined that the angular velocity until the n-th record is larger than the threshold value in step S172, the processing in steps S173 to S175 is skipped. Accordingly, as described above, it can be prevented that a movement component, which occurs when the user operates the input device 31 in the predetermined direction in the three-dimensional free space, is erroneously detected as a hand shake component.

In step S176, the calculation section 168 calculates the final amount of hand shake from the buffered amounts of hand shake. For example, the final amount of hand shake may be set by averaging the amounts of hand shake buffered and extracting a direct component. Any value corresponding to the amount of hand shake may be set as the final amount of hand shake. For example, a direct component extracted after averaging the plurality of amounts of hand shake stored, the value expressed in two steps, such as hand shake•no hand shake or large•small of the amount of hand shake, the value expressed in three steps, such as large•middle small of the amount of hand shake or large•small•no of the amount of hand shake, or the value expressed in multiple steps may be set as the final amount of hand shake.

The amount of hand shake calculated as described above is stored in the storage section 167. Then, the process returns to step S124 in FIG. 23 and the process in step S125 is executed.

On the basis of the amount of hand shake which has been measured and stored as described above, the same display control processing of an image to be controlled as in the case in step S32 of FIG. 10 is executed.

Thus, in the embodiment shown in FIG. 23, the hand shake measurement processing is performed by the television receiver 10 instead of the input device 31. Accordingly, since the configuration of the input device 31 is simplified, the cost can be reduced.

[Second Hand Shake Related Value Output Processing of an Input Device]

Next, another embodiment of the hand shake related value output processing that the input device 31 executes instead of the hand shake related value output processing shown in FIG. 9 will be described with reference to FIG. 27.

In the embodiment shown in FIG. 9, the amount of hand shake S(t) was calculated from the angular velocity (ωψ(t), ωθ(t)) in step S14. In the embodiment shown in FIG. 27, however, the amount of hand shake S(t) is calculated from the acceleration (ax(t), ay(t)) in step S206 corresponding to step S14 in FIG. 9.

In step S205, it is determined that the angular velocity until the n-th record is equal to or smaller than the threshold value. Accordingly, acquisition of buffering of the angular velocity (ωψ(t), ωθ(t)) in steps S201 and S203 are the same as those in the case shown in FIG. 9. In addition, in the present embodiment, the acceleration (ax(t), ay(t)) is acquired and buffered in steps S202 and S204. That is, the acceleration acquisition section 136 acquires the acceleration (ax, ay) which is detected by the acceleration sensor 59 and is extracted by the low pass filter 102. Specifically, the acceleration (ax, ay) is acquired after being A/D converted by the A/D converter built in the MPU 52 and is stored in the storage section 132.

Then, in step S206, the amount of hand shake S(t) is calculated using the acceleration (ax(t), ay(t)) buffered in step S204.

Specifically, the calculation section 134 calculates the size of hand shake in a frequency band by performing fast Fourier transform of the acceleration (ax(t), ay(t)) stored in step S204. The frequency range is typically 1 Hz to 20 Hz. However, the frequency range is not limited to this range. The amount of hand shake is calculated in the X and Y directions. In addition, a larger one of the amounts of hand shake in two directions can be set as the representative value. Alternatively, the sum of the two amounts of hand shake or the square root of the sum of the two amounts of hand shake may be set as the representative value.

In addition, the amount of hand shake S(t) may also be calculated by calculating the size of hand shake in the frequency band using a band pass filter, a high pass filter, or the like.

Figure 27:
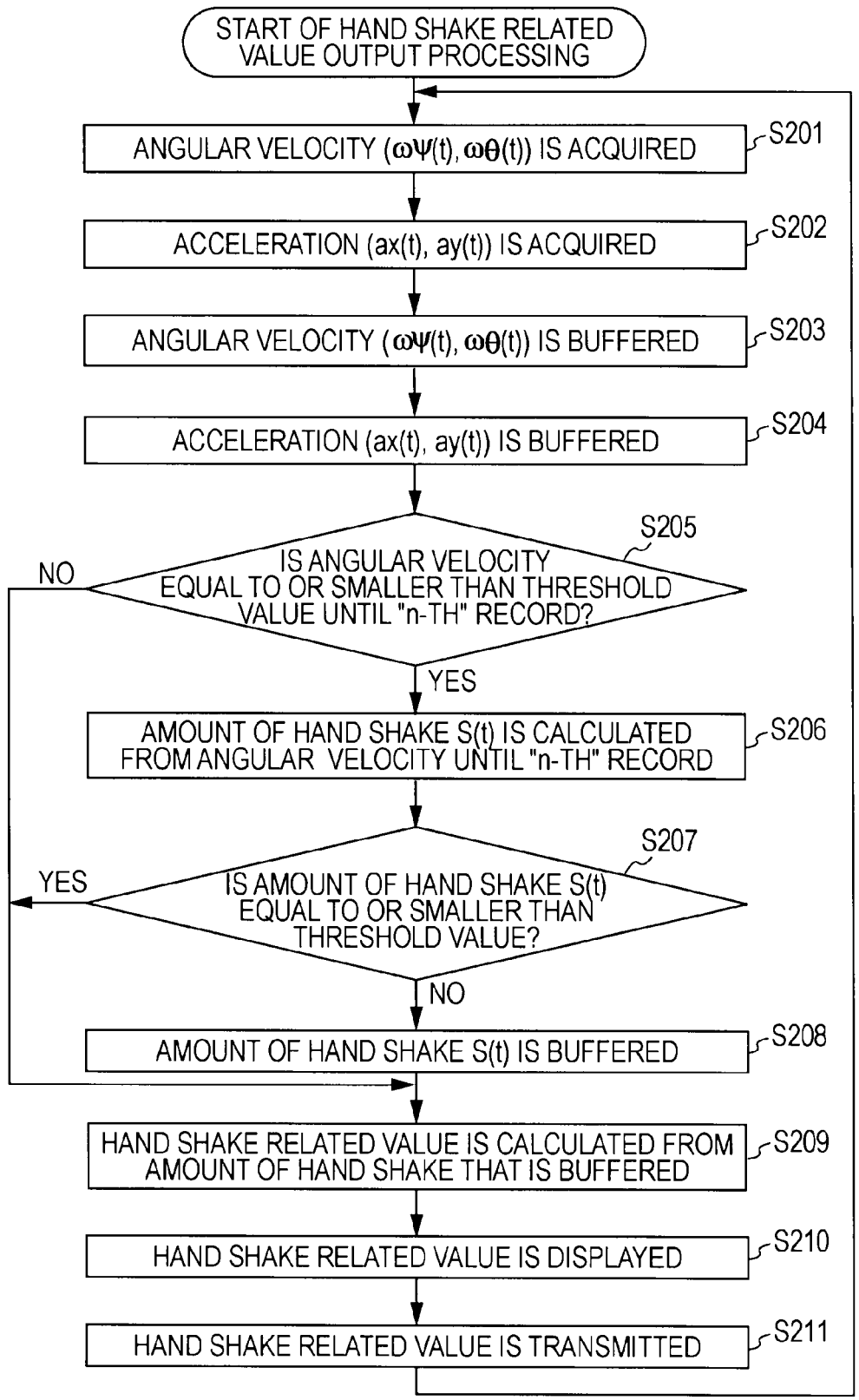
FIG. 27 is a flow chart illustrating the hand shake related value output processing.

The other processing in steps S201 to 5211 of FIG. 27 is the same as the corresponding processing in steps S11 to S19 of FIG. 9. Accordingly, the explanation will be omitted.

If the amount of hand shake S(t) is calculated from the acceleration instead of the angular velocity like the present embodiment, the amount of hand shake can be detected with sufficient sensitivity as the frequency becomes high. That is, since the angular velocity is a first derivative of time, the gain decreases as a frequency becomes high. On the other hand, since the acceleration is a second derivative of time, the gain does not change irrespective of a frequency. Therefore, the hand shake can be detected with sufficient sensitivity when the acceleration is used.

[Third Hand Shake Related Value Output Processing of an Input Device]

Next, still another embodiment of the hand shake related value output processing that the input device 31 executes instead of the hand shake related value output processing shown in FIG. 9 will be described with reference to FIG. 28.

Figure 28:
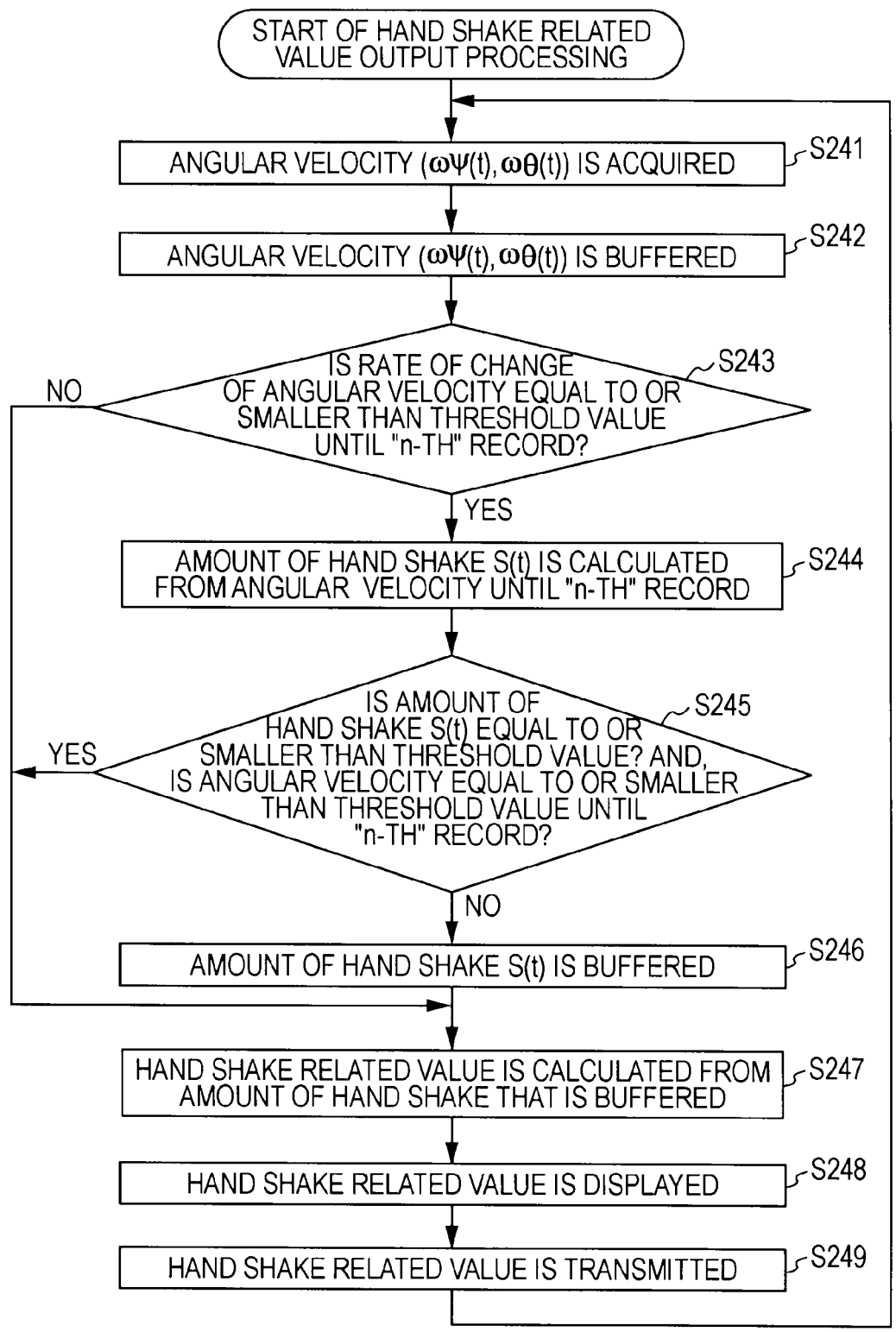
FIG. 28 is a flow chart illustrating the hand shake related value output processing.

In the embodiment shown in FIG. 28, instead of the angular velocity, the rate of change of the angular velocity is compared with the threshold value in step S243 corresponding to step S13 shown in FIG. 9. That is, in step S243, it is determined whether or not the rate of change of the angular velocity is equal to or smaller than the threshold value until the n-th record.

Specifically, when the following expressions are satisfied in all cases while incrementing the value of m from 0 to n−1, it is determined that the rate of change of the angular velocity is equal to or smaller than the threshold value until the n-th record.

$$|\omega\psi(t-m)-\omega\psi(t-m-1)| \leq \text{threshold value} \quad |\omega\theta(t-m)-\omega\theta(t-m-1)| \leq \text{threshold value} \quad (1)$$

Thus, it is determined whether or not there is any change of extreme movement. When there is no change of extreme movement, the amount of hand shake S(t) is calculated on the basis of the angular velocity when there is no change of extreme movement in step S244.

Then, in step S245 corresponding to step S15 shown in FIG. 9, it is determined whether or not the amount of hand shake S(t) is equal to or smaller than the threshold value and it is also determined whether or not the angular velocity is equal to or smaller than the threshold value until the n-th record. That is, in the present embodiment, when at least one of the angular velocities until the n-th record is larger than the threshold value even if the amount of hand shake S(t) is equal to or smaller than the threshold value, it is determined that the input device 31 is not placed on the table (is held by the user). On the contrary, when the amount of hand shake S(t) is larger than the threshold value even if the angular velocity until the n-th record is equal to or smaller than the threshold value, it is determined that the input device 31 is not placed on the table (is held by the user). In this case, in step S246, the storage section 132 buffers the amount of hand shake S(t).

When the amount of hand shake S(t) is equal to or smaller than the threshold value and the angular velocity until the n-th record is equal to or smaller than the threshold value, it is determined that the input device 31 is placed on the table (is not held by the user). In this case, the processing in step S246 is skipped and the amount of hand shake S(t) is not buffered.

That is, in the present embodiment, it is determined more correctly whether or not the input device 31 is placed on the table, that is, whether or not the input device 31 is held by the user. Therefore, the amount of hand shake can be measured more accurately.

The other processing in steps S241 to S249 of FIG. 28 is the same as the corresponding processing in steps S11 to S19 of FIG. 9. Accordingly, the explanation will be omitted.

By determining whether or not the rate of change of the angular velocity is equal to or smaller than the threshold value until the n-th record like the present embodiment, the amount of hand shake can be calculated not only in the case where the input device 31 stands still but also in the case where the input device 31 performs direct movement, such as uniform motion and uniformly accelerated motion. Accordingly, in this case, it is not necessary to display the icon 241 for measurement shown in FIG. 24. In addition, also when the user operates the input device 31 with direct movement in the three-dimensional free space, the hand shake can be detected.

[Fourth Hand Shake Related Value Output Processing of an Input Device]

Next, still another embodiment of the hand shake related value output processing that the input device 31 executes instead of the hand shake related value output processing shown in FIG. 9 will be described with reference to FIG. 29.

Figure 29:
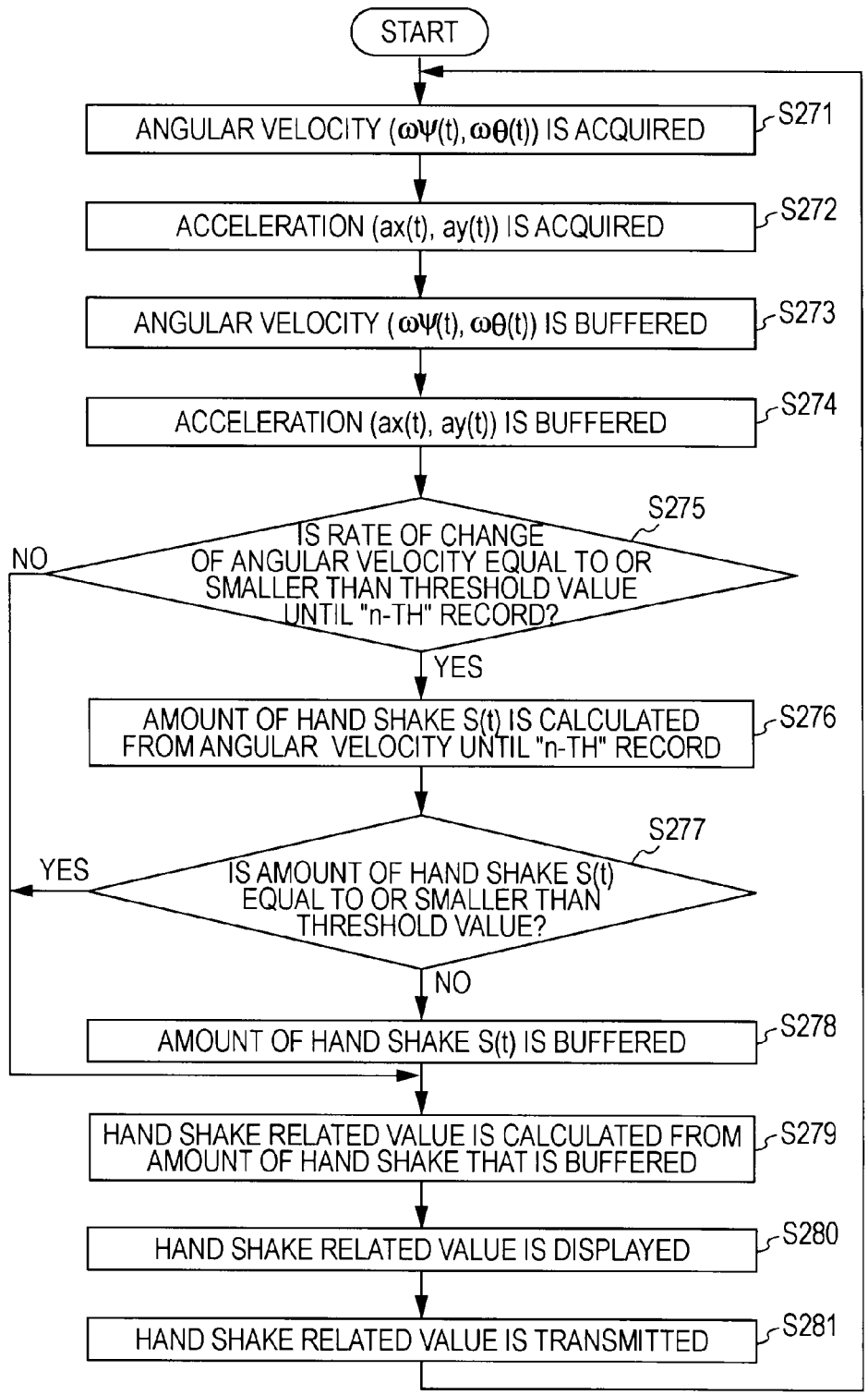
FIG. 29 is a flow chart illustrating the hand shake related value output processing.

In the embodiment shown in FIG. 29, the amount of hand shake S(t) is calculated from the acceleration (ax(t), ay(t)) instead of the angular velocity (ωψ(t), ωθ(t)), in step S276 corresponding to step S14 in FIG. 9.

Therefore, the acceleration (ax(t), ay(t)) is acquired and buffered in steps S272 and S274. Then, in step S276, the amount of hand shake S(t) is calculated using the acceleration (ax(t), ay(t)) buffered in step S274.

As a result, as described above, it becomes possible to detect the amount of hand shake with high sensitivity even if a frequency is high compared with the case where the amount of hand shake is calculated on the basis of the angular velocity. That is, since the angular velocity is a first derivative of time, the gain decreases as a frequency becomes high. On the other hand, since the acceleration is a second derivative of time, the gain does not change irrespective of a frequency. Therefore, the hand shake can be detected with sufficient sensitivity when the acceleration is used.

Moreover, in the present embodiment, instead of the angular velocity, the rate of change of the angular velocity is compared with the threshold value in step S275 corresponding to step S13 shown in FIG. 9. That is, in step S275, it is determined whether or not the rate of change of the angular velocity is equal to or smaller than the threshold value until the n-th record.

Thus, since the movement state of the input device 31 is determined on the basis of the rate of change of the angular velocity in the present embodiment, it is not necessary to display the icon 241 for measurement shown in FIG. 24 as described above. In addition, also when the user operates the input device 31 with direct movement in the three-dimensional free space, the hand shake can be detected.

The other processing in steps S271 to S281 of FIG. 29 is the same as the corresponding processing in steps S11 to S19 of FIG. 9. Accordingly, the explanation will be omitted.

[Operation when a Button is Operated]

Next, an operation when buttons, such as the buttons 33 and 34, the jog dial 35, and the button 36, have been operated will be described.

Figure 30:
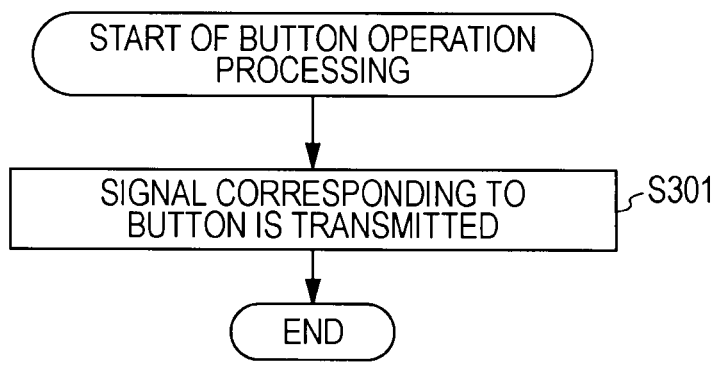
FIG. 30 is a flow chart illustrating the button operation processing of an input device.

In the input device 31, processing shown in the flow chart of FIG. 30 is executed when buttons, such as the buttons 33 and 34, the jog dial 35, and the button 36, have been operated.

That is, in step S301, the output section 135 transmits a signal corresponding to a button. Specifically, an operation signal corresponding to the operated button is transmitted as a radio wave from the transmission section 54 to the television receiver 10 through the antenna 55.

Figure 31:
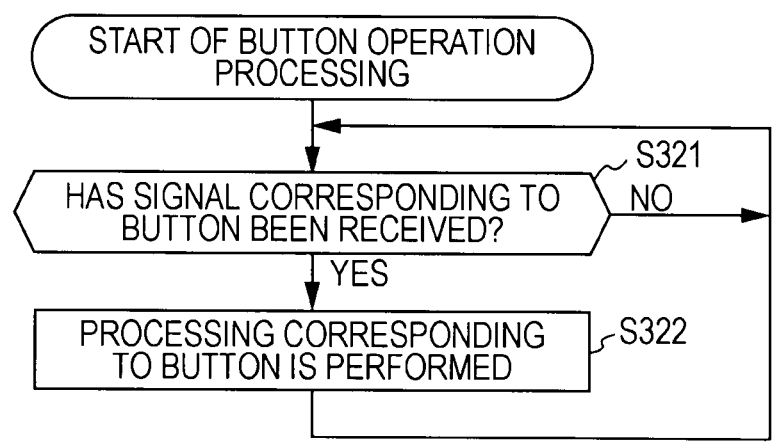
FIG. 31 is a flow chart illustrating the button operation processing of a television receiver.

In response to the above-described operation of the input device 31, button operation processing shown in the flow chart of FIG. 31 is executed in the television receiver 10.

That is, in step S321, the determination section 166 determines whether or not a signal corresponding to the button has been received. When the signal corresponding to the button has not been received yet, determination processing in step S321 is repeated. When the signal corresponding to the button has been received, the processing section 169 executes processing corresponding to the button in step S322. For example, when a predetermined icon has been selected, processing corresponding to the icon is executed.

Then, the process returns to step S321 and the same processing is repeated.

[Pointer Display Processing]

When the input device 31 is operated in the three-dimensional free space, an operation signal corresponding to the operation is transmitted from the input device 31 to the television receiver 10. In response to the operation, in the television receiver 10, the pointer 22 is moved in the direction corresponding to the operation and at the speed corresponding to the operation.

Figure 32:
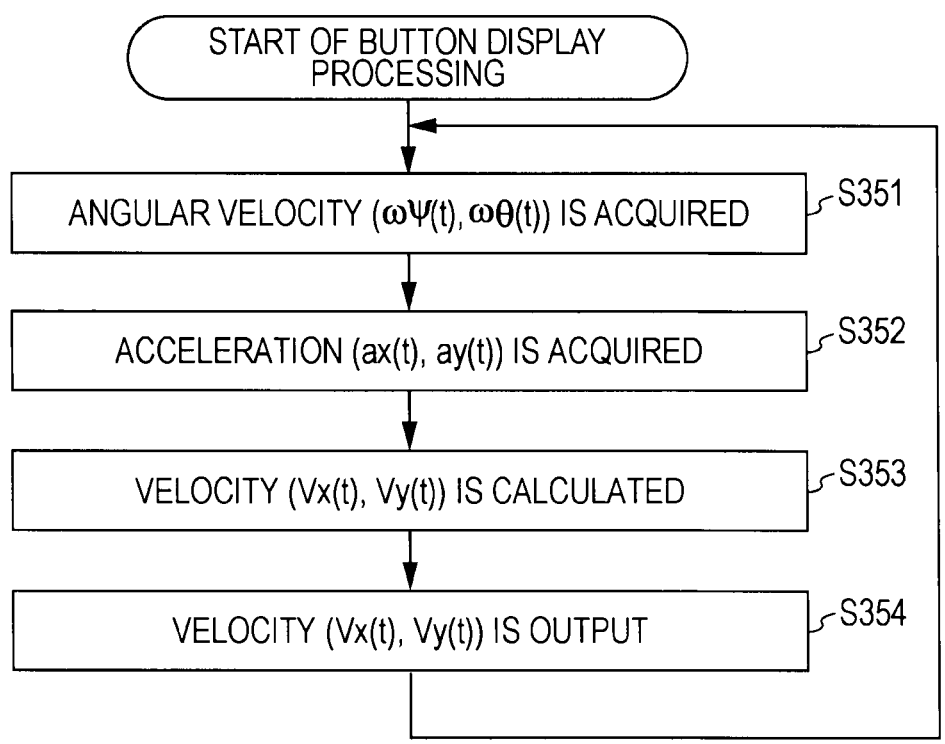
FIG. 32 is a flow chart illustrating the pointer display processing.

FIG. 32 shows the processing of the input device 31 in this case. This processing is executed when a user holds the main body 32 with a hand and operates a first-step switch of the button 33 or when the user operates the entire input device 31 in the arbitrary direction while pressing the switch in order to move the pointer 22 displayed on the output section 16 of the television receiver 10 in a predetermined direction, that is, when the entire input device 31 has been moved in the arbitrary direction in the three-dimensional free space.

In step S351, the angular velocity acquisition section 131 acquires an angular velocity signal output from the angular velocity sensor 58. That is, it is detected by the angular velocity sensor 58 that the user has operated the main body 32 in the predetermined direction in the three-dimensional free space while holding the main body 32 with a hand, and a detection signal of the angular velocity ($\omega\psi(t)$, $\omega\theta(t)$) according to the movement of the main body 32 is acquired.

In step S352, the acceleration acquisition section 136 acquires the acceleration (ax(t), ay(t)) output from the acceleration sensor 59.

In step S353, the calculation section 134 calculates the velocity (Vx(t), Vy(t)) of the input device 31. The velocity can be calculated by multiplying the angular velocity by the radius of rotation. That is, movement of the input device 31 when the user operates the input device 31 is mixing of rotational movement around the user's shoulder, elbow, or wrist. In addition, the radius of rotation is a distance from the rotation center, which changes for every time of the mixed rotational movement, to the input device 31.

The angular velocity $\omega\theta(t)$ around the X axis has a movement component in the Y-axis direction, and the angular velocity $\omega\psi(t)$ around the Y axis has a movement component in the X-axis direction. Accordingly, assuming that the velocity of the input device 31 is (Vx(t), Vy(t)), the radius of rotation ($R\psi(t)$, $R\theta(t)$) is expressed by the following explanation.

$$(R\omega(t), R\theta(t)) = (Vx(t), Vy(t))/(\omega\psi(t), \omega\theta(t)) \qquad (2)$$

(Vx(t), Vy(t)), ($\omega\psi(t)$, $\omega\theta(t)$) on the right side of expression (2) are the dimensions of velocity. Even if the velocity and the angular velocity expressed on the right side of the expression (2) are differentiated and become the dimensions of acceleration or the dimensions of the rate of temporal change of acceleration, the correlation relationship is still effective. Similarly, even if the velocity and the angular velocity are integrated and become the dimensions of displacement, the correlation relationship is effective.

Accordingly, following expressions (3) to (5) are obtained if the velocity and the angular velocity expressed on the right side of the expression (2) are set as the dimensions of displacement, acceleration, and rate of a temporal change of acceleration, respectively.

$$(R\psi(t), R\theta(t)) = (x(t), y(t))/(\psi(t), \theta(t)) \qquad (3)$$

$$(R\psi(t), R\theta(t)) = (ax(t), ay(t))/(\omega'\psi(t), \omega'\theta(t)) \qquad (4)$$

$$(R\psi(t), R\theta(t)) = (a'x(t), a'y(t))/(\omega''\psi(t), \omega''\theta(t)) \qquad (5)$$

Noting the expression (5), for example, among the above expressions, it can be seen that the radius of rotation ($R\psi(t)$, $R\theta(t)$) can be calculated if the variation (a'x(t), a'y(t)) of the acceleration (ax(t), ay(t)) and the variation ($\omega''\psi(t)$, $\omega''\theta(t)$) of the angular acceleration ($\omega'\psi(t)$, $\omega'\theta(t)$) are known. In the present embodiment, the radius of rotation ($R\psi(t)$, $R\theta(t)$) can be calculated on the basis of the expression (5).

That is, the calculation section 134 calculates the variation (a'x(t), a'y(t)) of the acceleration by differentiating the acceleration (ax(t), ay(t)). In addition, the calculation section 134 calculates the variation ($\omega''\psi(t)$, $\psi''\theta(t)$) of the angular acceleration ($\omega'\psi(t)$, $\omega'\theta(t)$) by differentiating the angular velocity ($\omega\psi(t)$, $\omega\theta(t)$) twice. In addition, the calculation section 134 calculates the radius of rotation ($R\psi(t)$, $R\theta(t)$) by dividing the variation (a'x(t), a'y(t)) of the acceleration by the variation ($\omega''\psi(t)$, $\omega''\theta(t)$) of the angular acceleration ($\omega'\psi(t)$, $\omega'\theta(t)$).

In addition, the calculation section 134 calculates the velocity (Vx(t), Vy(t)) by multiplying the calculated radius of rotation (Rψ(t), Rθ(t)) by the angular velocity (ωψ(t), ωθ(t)).

In step S354, the output section 135 outputs the calculated velocity (Vx(t), Vy(t)). That is, an operation signal indicating the velocity (Vx(t), Vy(t)) is transmitted from the transmission section 54 to the television receiver 10 through the antenna 55.

The above-described processing is repeatedly performed while the main body 32 is being operated.

In the above processing, the angular velocity may be simply used instead of the velocity. However, the operability when the radius of rotation is large is inferior to that in the above-described method.

In the television receiver 10, the receiving section 12 receives a signal from the input device 31 through the antenna 11. The MPU 13 maps the video RAM 15 so that the pointer 22 is displayed at the position corresponding to the received signal. As a result, in the output section 16, the pointer 22 is displayed at the position corresponding to the user's operation.

In addition, some or all of the processing in steps S351 to S354 in FIG. 32 may be executed in the television receiver 10. For example, it is possible to perform the processing until step S353 in the input device 31 and perform the processing in step S354 in the television receiver 10. In this case, since the configuration of the input device 31 is simplified, the burden can be reduced.

In addition, the angular velocity and the angular acceleration in the above processing may be simply set as the velocity and the acceleration, respectively.

<2. Second Embodiment>

Figure 33:
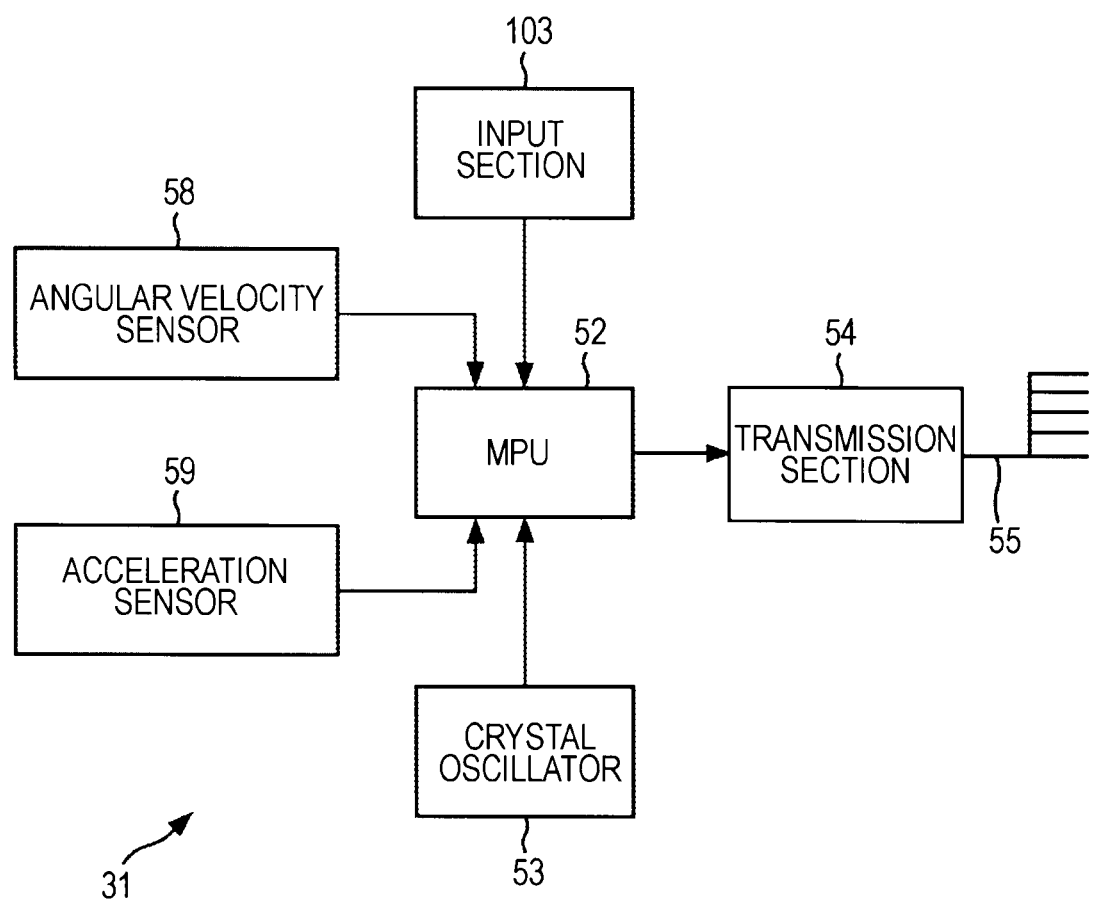
FIG. 33 is a block diagram illustrating the electrical configuration of the input device according to another embodiment.

FIG. 33 shows the configuration of the input device 31 according to another embodiment of the present invention. In the present embodiment, the low pass filters 101 and 102 in the above-described embodiment shown in FIG. 6 are omitted. The other configuration is the same as that in the case shown in FIG. 6.

If the sampling rate is sufficiently high, for example, if the frequency band of the angular velocity sensor 58 or acceleration sensor 59 is low and narrow, the embodiment shown in FIG. 33 can be adopted when aliasing does not cause a problem practically or when there is no practical problem even if the frequency characteristics of two sensors are different.

<3. Third Embodiment>

[Configuration of an Input Device]

Figures 34, 35:
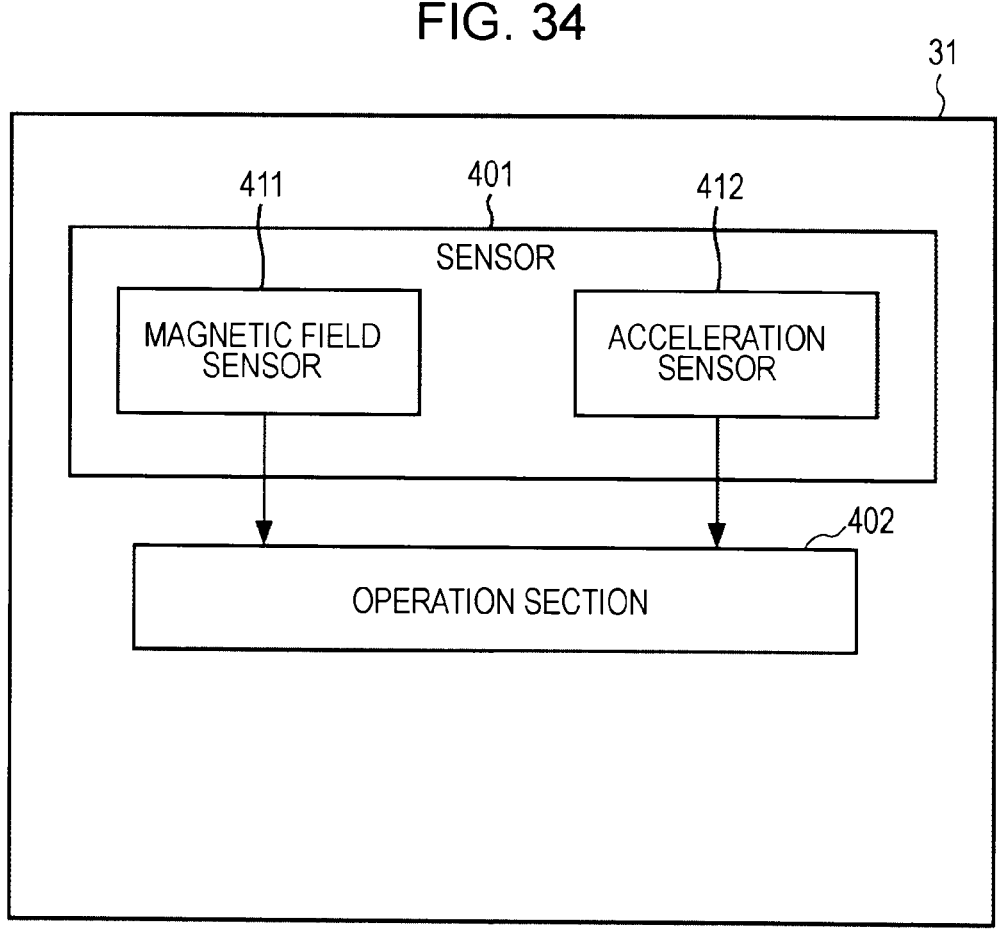
FIG. 34 is a block diagram illustrating the inside configuration of the input device according to another embodiment.
FIG. 35 is a diagram illustrating the combination of movement detection values in threshold value determination and calculation of the amount of hand shake.

Instead of the angular velocity sensor 58, a magnetic field sensor may be used. FIG. 34 shows the embodiment in this case.

In the present embodiment, the input device 31 has a sensor 401 and an operation section 402. The sensor 401 has a magnetic field sensor 411 and an acceleration sensor 412.

The user moves the input device 31 in the arbitrary direction. When the input device 31 has been operated, the magnetic field sensor 411 detects the absolute azimuth. The operation section 402 calculates the angular velocity by dividing the azimuths, which are detected before and after temporally, by time corresponding to the interval.

In addition, using the angular velocity, the hand shake related value output processing can be performed similar to the case described above.

[Modifications]

FIG. 35 shows the combination of movement detection values in threshold value determination and calculation of the amount of hand shake. In the above-described embodiments, in order to calculate the hand shake related value, the combination of movement detection values detected from the input device 31 is shown in FIG. 35. That is, in FIG. 9, the angular velocity is used for both threshold value determination (step S13) and calculation of the amount of hand shake (step S14). In FIG. 27, the angular velocity is used for threshold value determination (step S205), and the acceleration is used for calculation of the amount of hand shake (step S206). In FIG. 28, the rate of change of angular velocity and the angular velocity are used for threshold value determination (steps S243 and S245), and the angular velocity is used for calculation of the amount of hand shake (step S244). In FIG. 29, the rate of change of angular velocity is used for threshold value determination (step S275), and the acceleration is used for calculation of the amount of hand shake (step S276).

However, the acceleration may be used for both the threshold value determination and the calculation of the amount of hand shake. After all, any of the angle, the angular velocity, the displacement, and the acceleration may be used as the movement detection value, which results from an operation of the input device, for calculating the hand shake related value.

Moreover, in the above-described embodiments, the hand shake related value is calculated using an acceleration sensor and an angular velocity sensor as movement detection sensors. However, the movement detection sensor is not limited to these sensors, and a displacement related value detection sensor or an angle related value detection sensor may be used. As the displacement related value detection sensor, not only the acceleration sensor which detects the acceleration but also an image sensor which detects the displacement may be used. As the angle related value detection sensor, not only the angular velocity sensor which detects the angular velocity but also a magnetic field sensor which detects the angle (azimuth) may be used.

In addition, although the television receiver 10 has been used as the information processing apparatus operated by the input device 31, the present invention may also be applied to the case where a personal computer or other information processing apparatuses are controlled.

Moreover, when the information processing apparatus to be controlled is a portable information processing apparatus, such as a mobile phone or a PDA (Personal Digital Assistants), the input device 31 may be formed either separately from the portable information processing apparatus or integrally with the portable information processing apparatus. When the input device 31 is united with the portable information processing apparatus, an input operation is performed by operating the entire portable information processing apparatus in a predetermined direction.

Moreover, although the pointer moving operation has been described above, the operability can be similarly improved even if the present invention is applied to other GUI screen operations, such as scroll, zooming (enlargement and reduction), and rotation.

The series of processing described above may be executed by hardware or software. In the case of executing the series of processing using software, a program included in the software is installed in a computer provided in dedicated hardware or installed in a general-purpose personal computer, which is capable of executing various kinds of functions when various programs are installed, from a program recording medium.

Moreover, in this specification, the steps describing a program include not only processing performed in a time-series manner according to the described order but also processing performed in parallel or separately even if not necessarily performed in the time-series manner.

In addition, in this specification, the system indicates the entire apparatus formed by a plurality of devices.

The present application contains subject matter related to that disclosed in Japanese Priority Patent Application JP 2009-012984 filed in the Japan Patent Office on Jan. 23, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input device comprising:
    an operating section which is held by a user and operated in a three-dimensional free space to remotely operate an information processing apparatus;
    a calculation section which calculates, via a processor, a hand shake related value for controlling selection of an image to be controlled which is displayed on the information processing apparatus, the hand shake related value identifying an amount of hand shake of the operating section; and
    a light emitting section that emits light from the operating section based on the hand shake related value calculated by the calculation section;
    an output section which outputs the hand shake related value as an operation signal to remotely operate the information processing apparatus,
    wherein the operation signal of the hand shake related value controls the selection of a plurality of contents, as the image to be controlled, and the displaying of the contents on the information processing apparatus in an order based on the degree of the hand shake.

2. The input device according to claim 1, wherein the operation signal of the hand shake related value is a signal for controlling selection of a size of an icon, which forms a GUI, or a character attached to the icon as the image to be controlled.

3. The input device according to claim 1, wherein the calculation section calculates the hand shake related value from a second movement detection value when a first movement detection value calculated based on an operation of the input device is equal to or smaller than a predetermined value.

4. The input device according to claim 3, wherein each of the first and second movement detection values are any of angle, angular velocity, displacement, and acceleration.

5. The input device according to claim 4, wherein the operating section is the entire input device.

6. The input device according to claim 5, wherein the input device is united with the information processing apparatus.

7. The input device according to claim 1, wherein the operation signal of the hand shake related value is a signal for controlling selection of a size of a character which is displayed on a screen of the information processing apparatus as the image to be controlled.

8. The input device according to claim 1, wherein the output section changes an emission state of the light-emitting section according to the hand shake related value.

9. The input device according to claim 8, wherein the emission state is one of a brightness of the emitted light, color of the emitted light and flicker rate of the emitted light.

10. The input device according to claim 1, wherein each content of the plurality of contents is mapped to information describing the type of the content, the title of the content, and the genre of the content.

11. The input device according to claim 10, wherein the type of content, title of the content and genre of the content for each content of the plurality of contents are mapped to varying hand shake values corresponding to the degree of the handshake.

12. An input method comprising:
    holding and operating an operating section in a three-dimensional free space to remotely operate an information processing apparatus;
    calculating, via a processor, a hand shake related value for controlling selection of an image to be controlled which is displayed on the information processing apparatus, the hand shake related value identifying an amount of hand shake of the operating section;
    emitting light from the operating section based on the calculated hand shake related value; and
    outputting the hand shake related value as an operation signal to remotely operate the information processing apparatus,
    wherein the operation signal of the hand shake related value controls the selection of a plurality of contents, as the image to be controlled, and the displaying of the contents on the information processing apparatus in an order based on the degree of the hand shake.

13. A non-transitory computer-readable medium storing computer readable instructions thereon that when executed by a computer cause the computer to perform a method comprising:
    calculating a hand shake related value for controlling selection of an image to be controlled which is displayed on an information processing apparatus, the hand shake related value identifying an amount of hand shake of an input device which is held by a user and operated in a three-dimensional free space in order to remotely operate the information processing;
    emitting light from the input device based on the calculated hand shake related value; and
    outputting the hand shake related value as an operation signal to remotely operate the information processing apparatus by remote control,
    wherein the operation signal of the hand shake related value controls the selection of a plurality of contents, as the image to be controlled and the displaying of the contents on the information processing apparatus in an order based on the degree of the hand shake.

14. An information processing apparatus comprising:
    a receiving section operable to receive, as an operation signal from an input device operated in a three-dimensional space, a value identifying a degree of movement of the input device;
    a selection section operable to select plurality of content items based on the value received from the input device; and
    a display section operable to display the selected plurality of content items, as a list of recommended content items, in an order, wherein the order of the recommended content items in the list is based on the degree of movement of the input device.

15. The information processing apparatus according to claim 14, wherein the selection section selects and displays an icon which forms a GUI or a character attached to the icon, the icon or the character having a size proportional to the received value.

16. The information processing apparatus according to claim 14, further comprising:
    a calculation section operable to calculate the degree of movement of the input device based on the value received by the receiving section, wherein the selection section selects the plurality of content items to be controlled based on the degree of movement of the input device calculated by the calculation section and displays the selected plurality of content items on the display section.

17. The information processing apparatus according to claim 16, wherein the display section displays an icon for guiding measurement of the movement of the input device.

18. An information processing method comprising:
receiving, via a receiving section and as an operation signal from an input device operated in a three-dimensional space, a value identifying a degree of movement of the input device;
selecting, via a selection section, a plurality of content items based on the value received from the input device; and
displaying, on a display screen, the selected plurality of content items, as a list of recommended content items, in an order based on the degree of movement of the input device.

19. A non-transitory computer-readable medium storing computer readable instructions thereon that when executed by a computer cause the computer to perform a method comprising:
receiving, as an operation signal from an input device operated in a three-dimensional space, a value identifying a degree of movement of the input device;
selecting a plurality of content items based on the value received from the input device; and
displaying the selected plurality of content items, as a list of recommended content items, in an order, wherein the order of the recommended content items in the list is based on the degree of movement of the input device.

20. An information processing system comprising:
an input device; and
an information processing apparatus which is remote-controlled by the input device,
wherein the input device is held by a user and operated in a three-dimensional free space to remotely operate the information processing apparatus,
calculates, via a processor, a hand shake related value which identifies an amount of hand shake of the input device and is a value for controlling selection of an image to be controlled which is displayed on the information processing apparatus,
emits light based on the calculated hand shake related value; and
outputs the hand shake related value as an operation signal to remotely operate the information processing apparatus, and the information processing apparatus
receives the hand shake related value,
selects a plurality of contents as the image to be controlled based on the hand shake related value received from the input device displays the plurality of contents in an order based on the degree of the hand shake, and
displays the selected image to be controlled.

* * * * *